(12) United States Patent
Mugali et al.

(10) Patent No.: US 11,023,441 B2
(45) Date of Patent: Jun. 1, 2021

(54) DISTRIBUTED STORAGE AND PROCESSING OF HIERARCHICAL DATA STRUCTURES

(71) Applicant: Oracle International Corporation, Redwood Shores, CA (US)

(72) Inventors: Aditya Mugali, Portland, OR (US); Gennady Nurik, Ashburn, VA (US); Matthew Abrams, Las Cruces, NM (US); Robert O. Barnes, II, Herndon, VA (US)

(73) Assignee: Oracle International Corporation, Redwood Shores, CA (US)

( * ) Notice: Subject to any disclaimer, the term of this patent is extended or adjusted under 35 U.S.C. 154(b) by 250 days.

(21) Appl. No.: 15/977,330

(22) Filed: May 11, 2018

(65) Prior Publication Data

US 2018/0329935 A1 Nov. 15, 2018

Related U.S. Application Data

(60) Provisional application No. 62/504,886, filed on May 11, 2017.

(51) Int. Cl.
*G06F 16/22* (2019.01)
*G06N 3/08* (2006.01)
(Continued)

(52) U.S. Cl.
CPC ......... *G06F 16/2282* (2019.01); *G06F 16/25* (2019.01); *G06F 16/282* (2019.01);
(Continued)

(58) Field of Classification Search
None
See application file for complete search history.

(56) References Cited

U.S. PATENT DOCUMENTS 7,526,507 B2   4/2009  Holloway et al.
7,962,512 B1 *  6/2011  Sholtis .................. G06F 16/256
(Continued)

FOREIGN PATENT DOCUMENTS

WO   WO2014060718 A2   4/2014

OTHER PUBLICATIONS

"Taxonomy mapping" IBM Knowledge Center, Cognos Disclosure Mangament, Version 10.2.6m retrieved from https://www.ibm.com/suppon/knowledgecenter, Jun. 14, 2017, 3 pages.
(Continued)

*Primary Examiner* — Hau H Hoang
(74) *Attorney, Agent, or Firm* — Kilpatrick Townsend & Stockton LLP

(57) ABSTRACT

The present disclosure generally relates to storing, processing, and classification of content resources, such as documents, web-based resources, and other content. More particularly, the present disclosure describes techniques for distributed storage of network session data in hierarchical data structures stored on multiple servers and/or physical storage devices, and techniques for analyzing and classifying the distributed hierarchical structures. Such techniques may include executing different machine-learning algorithms on different servers and/or different storage devices, and generating node mapping data between a plurality of different hierarchical structures and a top-level derivative hierarchy that references the underlying hierarchical structures in order to access and manage the different distributed taxonomies within the underlying hierarchical structures.

20 Claims, 11 Drawing Sheets

(51) Int. Cl.
*G06N 20/00* (2019.01)
*G06F 16/28* (2019.01)
*G06F 16/25* (2019.01)
*G06N 20/10* (2019.01)
*G06N 5/02* (2006.01)
*G06N 5/04* (2006.01)

(52) U.S. Cl.
CPC ............... *G06N 3/08* (2013.01); *G06N 5/022* (2013.01); *G06N 5/046* (2013.01); *G06N 20/00* (2019.01); *G06N 20/10* (2019.01)

(56) References Cited

U.S. PATENT DOCUMENTS

| | | |
|---|---|---|
| 7,974,984 B2 | 7/2011 | Reuther |
| 9,152,705 B2 | 10/2015 | Lamba et al. |
| 9,208,435 B2 | 12/2015 | Zelevinsky |
| 9,262,506 B2 | 2/2016 | Emanuel |
| 9,613,371 B2 | 4/2017 | Subramanya et al. |
| 2008/0222613 A1* | 9/2008 | Allen .................. G06F 16/335 717/128 |
| 2018/0121533 A1* | 5/2018 | Magnani .................. G06N 3/08 |

OTHER PUBLICATIONS

Raunich, et al., "Target-driven merging of taxonomies with ATOM", Elsevier Ltd, retrieved from https://dbs.uni-leipzig.de/file/ATOM-IS2014.pdf, Nov. 25, 2013, 14 pages.

\* cited by examiner

DISTRIBUTED STORAGE AND PROCESSING OF HIERARCHICAL DATA STRUCTURES

CROSS-REFERENCE TO RELATED APPLICATIONS

The present application is a non-provisional of and claims priority to U.S. Provisional Patent Application No. 62/504,886, entitled "RESOURCE CLASSIFICATION USING TREE STRUCTURES AND EFFICIENT PROCESSING OF TREE STRUCTURES IN A DISTRIBUTED ENVIRONMENT," filed May 11, 2017, the entire contents of which are incorporated by reference herein for all purposes.

TECHNICAL FIELD

The present disclosure generally relates to storing, processing, and classification of content resources, such as documents, web-based resources, and other content. More particularly, the present disclosure describes techniques for distributed storage of network session data in hierarchical data structures stored on multiple servers and/or physical storage devices, and techniques for analyzing and classifying the distributed hierarchical structures. Such techniques may include executing different machine-learning algorithms on different servers and/or different storage devices, and generating node mapping data between a plurality of different hierarchical structures and a top-level derivative hierarchy that references the underlying hierarchical structures in order to access and manage the different distributed taxonomies within the underlying hierarchical structures.

BACKGROUND

The continuous expansion of the Internet, the expansion and sophistication of enterprise computing networks and systems, the proliferation of content stored and accessible over computer networks, and numerous other factors continue to drive the need for large sophisticated data storage systems. Consequently, as the demand for data storage continues to increase, larger and more sophisticated storage systems are being designed and deployed. Such storage systems may be used not only for storing libraries of documents, web-based content, and other network-accessible resources, but also for storing and analyzing data relating to the access and usage of such content resources.

To this end, machine learning techniques may be used for data mining and knowledge discovery, including searching for and describing useful structural patterns in data. Machine learning techniques may have the ability to acquire new knowledge, new skills, and reorganize existing knowledge from experience and refine and improve an existing knowledge base. Machine learning has a wide range of applications, including search engines, medical diagnosis, text and handwriting recognition, image screening, load forecasting, marketing and sales diagnosis, and the like

SUMMARY

Certain embodiments of the present disclosure relate generally to systems and methods of distributed data storage, processing, and classification of content.

Various techniques are described herein for generating a plurality of distributed storage data structures on a plurality of physical data storage devices and/or computer servers. Multiple different hierarchical data structures each may comprise a plurality of nodes arranged within multiple logical levels, and each hierarchical data structure may be generated using a machine-learning algorithm based on a data set corresponding to a set of content resources accessed during network sessions. In some embodiments, various different hierarchical data structures may be assigned different unique data sets corresponding to networking sessions of different system users. Additionally or alternatively, different hierarchical data structures may be generated using different machine-learning algorithms, including but not limited to article extraction algorithms, BM25f ranking algorithms, LIBLINEAR large-scale linear classification algorithms, and/or bag-of-words vector space modeling algorithms.

Additional techniques described herein relate to generating an additional hierarchical data structure, which may be referred to as a derivative hierarchy (or product hierarchy), which may include various node mapping data defining associations between each node of the derivative hierarchy and various combinations nodes in the underlying distributed hierarchical data structures. Such node mapping data may define sets of logical conjunction rules associating each node in the derivative hierarchy with a plurality of additional nodes within multiple different distributed hierarchical data structures. In some embodiments, updates to the derivative hierarchy may be performed by revising the node mapping data and/or logical conjunctions for certain nodes within the derivative hierarchy, so that the revisions to the derivative hierarchy do not affect the structural arrangements and/or the associated data stored within any of the underlying hierarchical data structures storing the content resource access data for different system users and/or network sessions.

Further techniques described herein relate to receiving and processing requests via one or more computer interfaces, using the derivative hierarchy to access and retrieve particular data from the underlying distributed hierarchical data structures. For example, a computer server accessing the derivative hierarchy may receive requests identifying resource classification topics, retrieve one or more nodes of the derivative hierarchy corresponding to the requests, and then using the node mapping data to access and retrieve data from the underlying distributed hierarchies. Such retrieved data may include node data, such as corresponding classification topics, as well as specific content resource data and/or user data stored at the distributed hierarchies which are related to the classification topics. In other examples, a computer server accessing the derivative hierarchy may receive requests including particular content resources, such as documents and/or web-based resources, to be classified within the taxonomy of the derivative hierarchy. In such examples, the computer server may initiate a classification request in each of the underlying distributed hierarchies, and then aggregate and process the results to determine one or more classification(s) for the content resource.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of embodiments according to the present disclosure may be realized by reference to the remaining portions of the specification in conjunction with the following appended figures.

Figure 1:
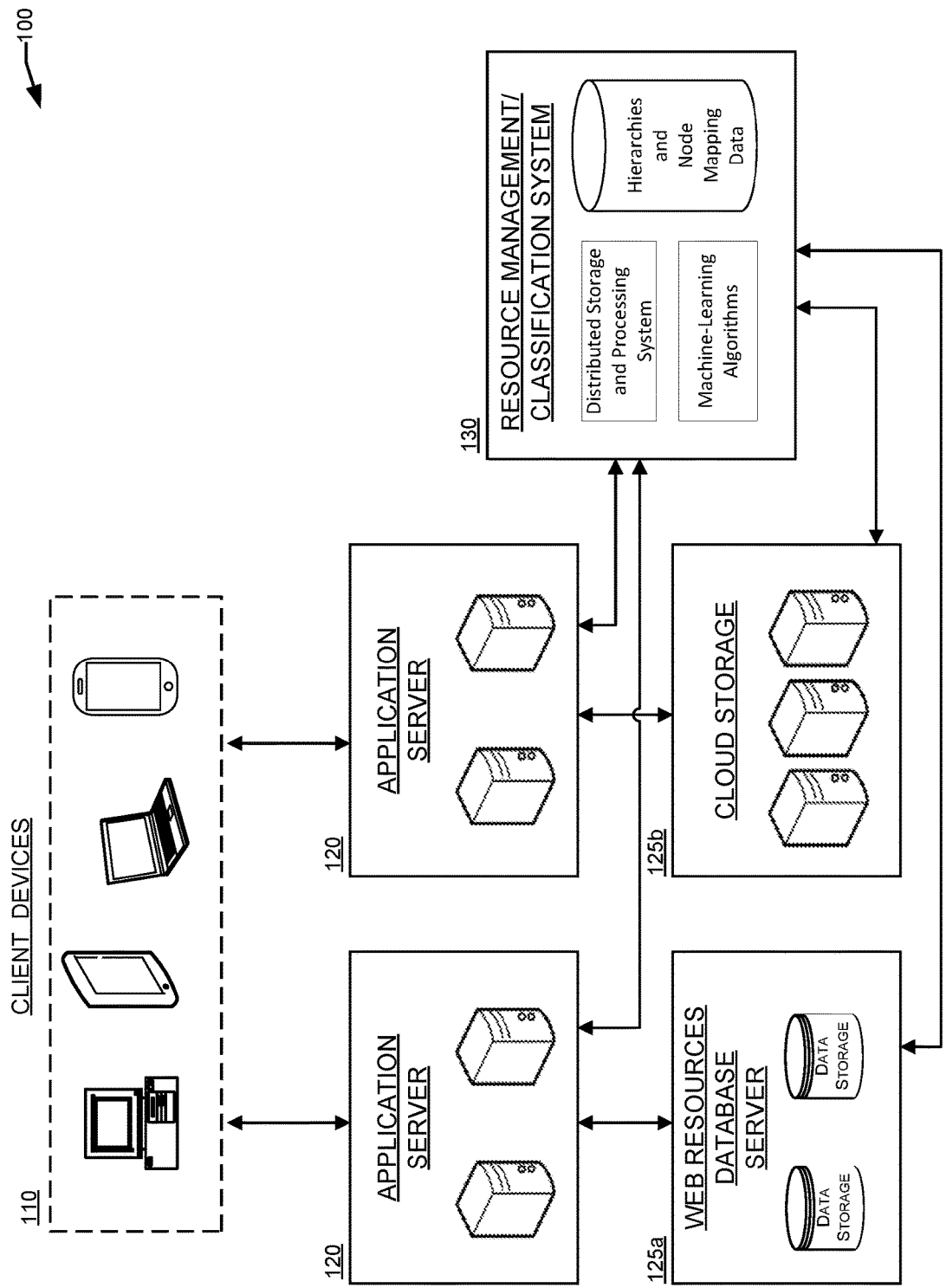
FIG. 1 is a block diagram illustrating an example computing infrastructure including a content resource management and classification system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, digital signal processors (DSPs), or the like. In some examples, some or all of the processing units can be implemented using customized circuits, such as application specific integrated circuits (ASICs), or field programmable gate arrays (FPGAs).

Various techniques (e.g., systems, methods, computer-program products tangibly embodied in a non-transitory machine-readable storage medium, etc.) are described herein for generating multiple distributed storage data structures on a plurality of physical data storage devices and/or different computer servers. Multiple different hierarchical data structures each may include an arrangement of related hierarchical nodes over multiple logical levels. In some embodiments, each of the hierarchical data structures may be generated using a machine-learning algorithm (and/or other algorithms or criteria), whereby the machine-learning algorithm is applied to a particular data set corresponding to the set of content resources (e.g., documents, web pages, etc.) accessed by particular users during a plurality of computing/networking sessions. In certain cases, a system architecture may include assigning different subsets of systems users to the different hierarchical data structures, so that each hierarchy, after it has been generated and populated with its respective machine-learning algorithm may reflect the data from the networking sessions (e.g., web-browsing sessions) collected for its respective subset of users. Additionally or alternatively, different hierarchy structures may be generated using different machine-learning algorithms, including but not limited to article extraction algorithms, BM25f ranking algorithms, LIBLINEAR large-scale linear classification algorithms, neural networks or deep learning neural networks, and/or bag-of-words vector space modeling algorithms.

Additional techniques described herein relate to generating an additional hierarchical data structure, which may be referred to a derivative hierarchy (or product hierarchy). In some embodiments, derivative hierarchies may function conceptually like virtual databases, and may potentially be implemented as virtual databases, wherein the derivative hierarchies do not directly store any of the content resource access and classification data that is stored in the underlying hierarchical data structures, but instead contains various node mapping data that defines associations between nodes of the derivative hierarchy and various different nodes in one or a plurality of the underlying hierarchical data structures. Such node mapping data may define sets of logical conjunction rules (e.g., ANDing and ORing relationships) that associate each node in the derivative hierarchy with one or more nodes within the underlying distributed hierarchical data structures. As discussed below, the logical conjunction rules may be simple (e.g., a one-to-one mapping between nodes) or complex (e.g., one-to-many mappings to nodes in multiple different underlying hierarchies, including AND/OR logical rules to further define the derivative node). Additionally, in some embodiments, the derivative hierarchy may be revised and/or updated by revising the node mapping data and/or logical conjunctions for its different nodes, so that the derivative/product hierarchy may be revises without altering or affecting any of the node/level structural arrangements or the associated data stored within the nodes of the underlying hierarchical data structures. As discussed below, this provides technical advantages in many embodiments, by allowing derivative hierarchies to be generated, modified, and customized quickly and with low storage overhead. In some cases, these derivative hierarchies may be designed and used for a single purpose, such as an analysis for a search engine or an Internet targeted advertising campaign, where a particular derivative hierarchy may be defined with custom node mapping rules, such that the generation or modifications to the custom derivative hierarchy do not alter, affect, or necessitate regeneration of the underlying hierarchical data structures.

Further techniques described herein relate to receiving and processing requests via one or more computer interfaces, using the derivative hierarchy to access and retrieve particular data from the underlying distributed hierarchical data structures. For example, a computer server accessing the derivative hierarchy may receive requests identifying resource classification topics, retrieve one or more nodes of the derivative hierarchy corresponding to the requests, and then using the node mapping data to access and retrieve data from the underlying distributed hierarchies. Such retrieved data may include node data, such as corresponding classification topics, as well as specific content resource data and/or user data stored at the distributed hierarchies which are related to the classification topics. In other examples, a computer server accessing the derivative hierarchy may receive requests including particular content resources, such as documents and/or web-based resources, to be classified within the taxonomy of the derivative hierarchy. In such examples, the computer server may initiate a classification request in each of the underlying distributed hierarchies, and then aggregate and process the results to determine one or more classification(s) for the content resource.

With reference now to FIG. 1, a block diagram is shown illustrating various components of a system 100 for content resource management and classification, including a number of client devices 110 accessing application servers 120, underlying database/cloud servers 125. In some cases, the application servers 120 may correspond to web servers, and the interactions between client devices 110 and servers 120 may be Internet-based web browsing sessions, during which system users access various web-based content resources stored on the various web application servers 120. Additionally or alternatively, application servers 120 may correspond to document servers and/or any other type of computer-based storage storing and providing access to various types of content resources, including documents, data files, web pages, streaming content, software applications, etc. The various computing infrastructure elements shown in this example (e.g., application servers 120, database servers 125a, cloud storage systems 125b) may correspond to a high-level computer architecture created and maintained by an enterprise or organization that provides Internet-based services and/or content to various client devices 110. The content resources (e.g., documents, web pages, etc.) available to client devices 110 may be provided via document stores, web sites, web services, and/or more complex computing infrastructure instances which may include, for example, eCommerce systems, enterprise resource planning (ERP) systems, document management systems, customer relationship management (CRM) systems, and the like. Thus, computing infrastructure within the application servers 120, and data storage components 125 may be built and maintained by enterprises or other organizations, such as an educational institutions or governmental entities, to provide Internet-based services to users such as customers, employees, students, or other organization members. The system 100 shown in FIG. 1 may be implemented a cloud-based multi-tier system in this example, in which upper-tier user devices 110 may request and receive access to the network-based resources and services via the application servers 120, and wherein the application servers may be deployed and executed upon an underlying set of resources (e.g., cloud-based, SaaS, IaaS, PaaS, etc.) including hardware and/or software resources 125. Additionally, although cloud-based systems may be used in some embodiments, systems 100 in other examples may use on-premise datacenters, server farms, distributing computing systems, and other various non-cloud computing architectures.

The components shown in system 100 for providing network-based content and/or Internet-based resources and services to client devices 110 may be implemented in hardware, software, or a combination of hardware and software. For example, web services may be generated, deployed, and executed within application web servers 120 within datacenters, using the underlying system hardware or software components such as data storage devices, network resources, computing resources (e.g., servers), and various software components. In some embodiments, web services may correspond to different software components executing on the same underlying computer server(s), networks, data stores, and/or within the same virtual machines. Some web-based content, computing infrastructure instances, and/or web services provided by application web servers 120 may use dedicated hardware and/or software resources, while others may share underlying resources 125 (e.g., shared cloud). In either case, certain higher-level services (e.g., user applications), as well as users at client devices, need not ever be aware of the underlying resources being used to support the services.

The application servers 120, database servers 125 and cloud storage systems 125, and other infrastructure components such as web caches, network components, etc. (not shown in this example), may include various hardware and/or software components (e.g., application programming interfaces (APIs), cloud resource managers, etc.) to provide and monitor the access/execution of the content resources, as well as to manage the underlying storage/server/network resources. The underlying resources of the database servers and/or cloud storage systems 125 may include, for example, a set of non-volatile computer memory devices implemented as databases, file-based storage, etc., a set of network hardware and software components (e.g., routers, firewalls, gateways, load balancers, etc.), a set of host servers, and various software resources such as, store software images, installations, builds, templates, configuration files, and the like, corresponding to different versions of various platform, server, middleware, and application software. The datacenters housing the application servers 120 and underlying storage systems 125 also may include additional resources such as hypervisors, host operating systems, resource managers and other cloud-based applications, along with the hardware and software infrastructure to support various Internet-based services, such as Infrastructure as a Service (IaaS), Platform as a Service (PaaS), and Software as a Service (SaaS). Additionally, the underlying hardware of the datacenters may be configured to support a number of internal shared services, which may include, for example, security and identity services, integration services, repository services, enterprise management services, virus scanning services, backup and recovery services, notification services, file transfer services, and the like.

As noted above, many different types of computer architectures (cloud-based, web-based, hosting, multi-tier computing environments, distributed computing environments, etc.) may be used to provide the web-based content resources from the application servers 120 to the client devices 110 in accordance with various embodiments described herein. However, in certain implementations, cloud computing platforms may be used to provide certain advantageous features for generation and management of web-based content. For example, cloud computing platforms may provide elasticity and scalability to quickly provision, configure, and deploy many different types of computing infrastructure instances, in contrast to non-cloud based implementations having fixed architectures and limited hardware resources. Moreover, public cloud, private cloud, and public-private hybrid cloud platforms may be used in various embodiments to leverage the features and advantages of each distinct architecture.

Additionally, as shown in this example, system 100 also includes a resource management and classification system 130. In this example, the resource management and classification system 130 may include a distributed storage processing system, one or more machine learning-based classification algorithms (and/or non-machine learning-based algorithms), and/or a storage architecture including multiple classification hierarchy data structures and mapping data relating different nodes of the classification hierarchies. As discussed in more detail below, in some embodiments resource management and classification system 130 may correspond to a distributed data storage and processing system such as the HYDRA® open source framework, which may include the distributed storage processing system and the hierarchy (or tree) storage and mappings. As shown in this example, the resource management and classification system 130 may access content resources via one or more application servers 120 (e.g., network-based document stores, web-based content providers, etc.) and/or resource storage components 125. For example, within system 100, specialized JavaScript or other software components may be installed and operate on one or more application servers 120, database servers 125*a* and/or cloud systems 125 storing network-based content. These software components may be configured to transmit network-based content resources (e.g., web pages, sites, documents, services/objects, etc.), to the resource management and classification system 130 for analysis and classification. For example, each time a user lands on a webpage via a server or device containing the software component, the component may transmit data back to the resource management and classification system 130 indicating the URL accessed, the user, the time, and/or a cookie ID. The resource classification system 130 may be scalable to look at millions of URLs on a daily basis, and further performing a topic analysis for each of those URLs. The analysis may identify a name, place, or an optimization that may come from the user. In the context of classification of web pages/web sites, example classification topics may include electronic products, politics, food, or sports, etc. Additionally, although in this example, the resource management and classification system 130 is depicted as being implemented separately from the application servers 120 and storage devices 125, in other examples, resource management and classification systems 130 may be implement locally with either the application servers 120 and/or the storage devices 125, and thus need not receive separate transmissions of content resources from those device, but rather may analyze and classify those content resources that are stored or provided by their respective systems.

In some embodiments, a software component may be installed on a document server, web server, and the like, that may allow a sharing toolbox to pop up so that interested users may share a particular document, web page or site, etc., via email, social media sharing, etc. In addition to the examples shown in system 100, similar software components may operate on web hosting platforms, web caches, and/or other content provider or storage systems, to provide content resources to various resource management and classification systems 130. Additionally or alternatively, the resource management and classification system 130 may receive data corresponding to web pages and other content from client devices 110, intermediary network devices of the local and/or access networks by which the client devices 110 request and receive web-based content resources. In still other examples, different independently-operated resource management and classification systems 130 may be integrated within separate application servers 120, web caches, database servers 120*b*, cloud storage systems 125*b*, client devices 110, and/or web hosting platform, etc.

As discussed below, the various components and subsystems of the resource management and classification system 130 may be configured to receive and classify content resources into various classification hierarchies. For example, the resource classification system 130 may receive large quantities of content resources such as documents or web pages, may use one or more classification algorithms (e.g., different combinations of machine-learning algorithms) to analyze and classify their respective resources into a taxonomies (stored as tree or hierarchy data structures) based on content classification. Multiple hierarchies may be generated and stored, and mapping between specific levels/nodes of the different hierarchies may be detected and/or defined. Additionally, a rules-based logical layer may be implemented on top of the different physical hierarchies, providing a single interface that can access and leverage the classification data in each of the underlying classification hierarchies.

Figure 2:
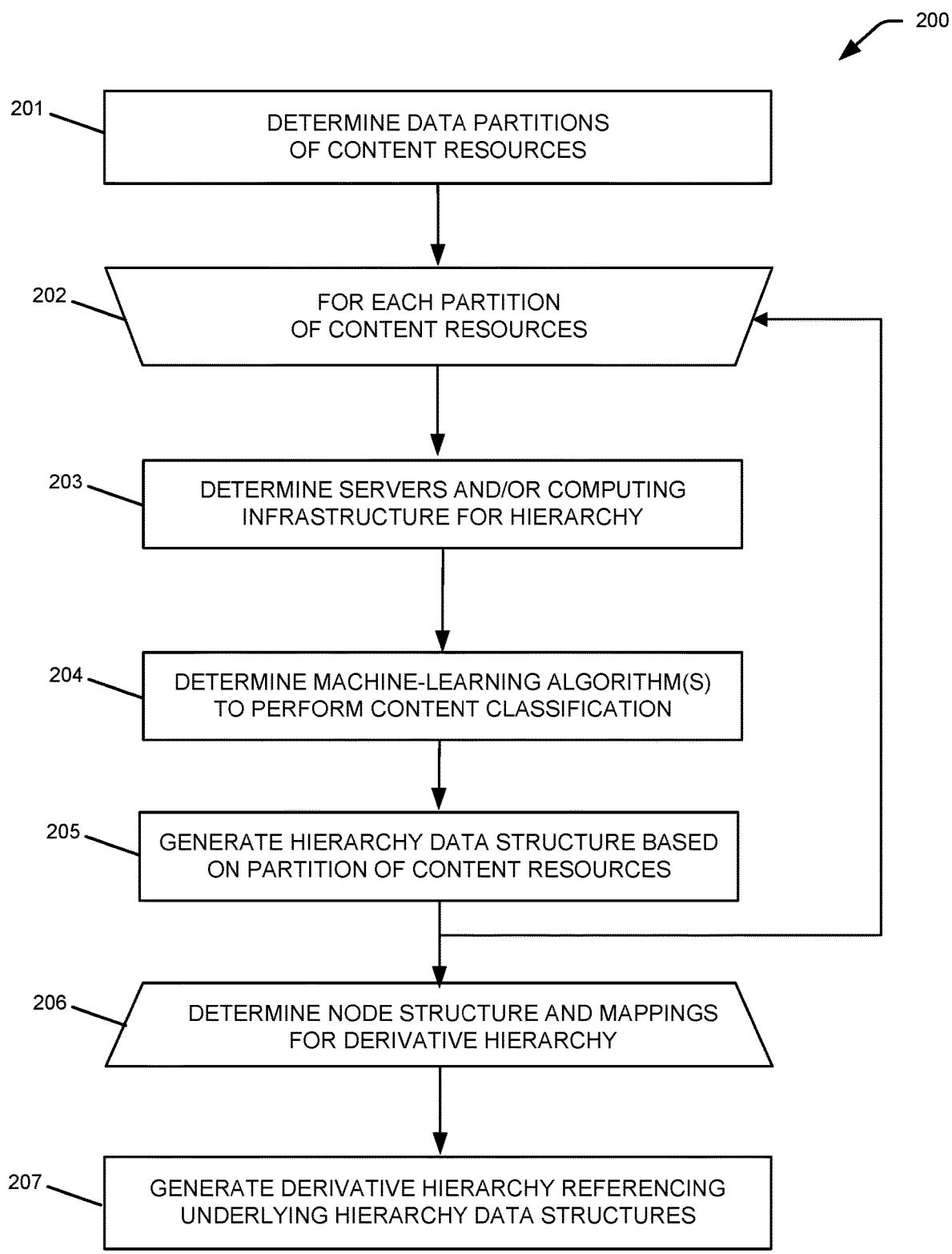
FIG. 2 is a flow diagram illustrating an example process of generating a plurality of underlying hierarchy data structures and a derivative hierarchy, in accordance with certain embodiments of the present disclosure.

Referring now to FIG. 2, a flow diagram is shown illustrating an example process by which a plurality of underlying hierarchy data structures are created, along with a derivative hierarchy (which also may be referred to herein as a product hierarchy or a virtual hierarchy). As described below, the steps in this process may be performed by one or more components in system 100, including the resource management and classification system 130 and/or related application server 120 and/or distributed data storage and processing systems 125. However, it should be understood that the various techniques described herein for determining data partitions of content resources, generating separate classification hierarchy data structures, and generating derivative hierarchies, need not be limited to the specific systems and hardware implementations described above, but may be performed within other computing environments comprising other combinations of the hardware and software components described herein.

In step 201, the resource management and classification system 130 may determine a number of data partitions among one or more stores of content resources. As noted above, the content resources may be, for example, web pages, web sites, web services, and/or other Internet-based resources that are accessible to client devices via application servers 120 and underlying data storage systems 125. For the purposes of classifying web pages and other Internet-based resources, and for relating groups of content resources together, the data partitioned in step 201 may include not only the content resources themselves (e.g., web pages/sites) but also data relating to the network sessions during which the resources were accessed. This network access data may include data identifying the times, client devices, client device types, system users, networks, network session identifiers, and the like for the network requests and responses relating to each of the content resources. Thus, such data may include web-browsing session data stored by and retrieved from application servers 120, storage systems 125, client devices 110, and/or separate network nodes such as web caches, routers, and the like. As discussed below in more detail, the derivative hierarchies based on this data may have technical applications and advantages in the fields of search engines, customized content and targeted advertisement campaigns, etc. Thus, the identity of the particular system users that accessed the content resources, the access times, the client devices, the access networks, and the other resources accessed by the same users and/or during the same network sessions may be collected and stored as well.

The partitioning of data in step 201 may be optional in certain embodiments. However, for large-scale and/or data intensive implementations (e.g., tracking and classifying document access and/or web-browsing behavior for large numbers network users), the partitioning of data may have significant technical advantages with respect to processing speed, efficiency, and scalability. Furthermore, as discussed below, in addition to the technical advantages associated with distributed processing (e.g., speed, efficiency, scalability, failover, etc.), partitioning may have additional technical advantages in certain embodiments. Specifically, different data sets and/or different classification algorithms may be assigned to different data partitions, which may result in more options and flexibility when mapping different hierarchical nodes in different ways at a top-level derivative hierarchy. By using different machine-learning algorithms (and/or non-machine learning algorithms) and/or different non-random data sets to generate and populate different classification hierarchy data structures, each classification hierarchy may be structured differently and may be more or less accurate or effective for certain types of applications (e.g., search engine results, related-content recommendations, targeted advertising, etc.).

In some embodiments, a data store (or stores) relating to network-based resource access sessions by users (e.g., document access sessions, web-browsing sessions, etc.) may be partitioned based on the system user. For example, all network session data for a first subset of users may be designated to a first partition, all network session data for a second subset of users may be designated to a second partition, all network session data for a third subset of users may be designated to a third partition, and so on. In other examples, the data relating to network access of content resources by users may be partitioned based on other factors or variables, such as partitioning by domain (e.g., for web-browsing/web-hosting), partitioning by application server 120, partitioning based on the software application, partitioning based on client device type and/or device manufacturer, etc.

After determining one or more data partitions in step 201, steps 202-205 may be performed separately (e.g., sequentially or in parallel) for each of the data partitions. As discussed below, the data associated with each partition may be used to build and populate a classification hierarchy data structure. In step 203, the resource management and classification system 130 may determine the physical computing resources on which the classification hierarchy data structure is to be generated. In some cases, all classification hierarchies may be generated within the same computing environment, for example, within the data stores and using the processors of the system 130. In other cases, the generation, storage, and maintenance of classification hierarchies may be distributed across different computing systems, in order to gain technical advantages of distributed processing.

In step 204, the resource management and classification system 130 may determine one or more algorithms that to be used in the content classification process for the data partition. In some embodiments, various different machine-learning algorithms may be supported and implemented in different embodiments, as well as various non-machine-learning algorithms. Additionally, multiple different machine-learning algorithms may be assigned to different data partitions, thus likely resulting in classification hierarchies that have different tree-structure arrangements of levels and nodes. Several examples are described below of machine-learning based classifications that may be selected in step in 204 and performed in step 205. For such examples, the generation of high-quality classification hierarchies may depend on a high-quality training set of data, so that proven and true training data may be used to train the machine learning models. Additionally, a high-quality predetermined taxonomy may be used to provide an initial classification of the topics in the content resources. For instance, the topic "Sports" may have level two category and a level three category. Similarly, the topic "Politics" may have multiple categories. Such techniques may go beyond traditional academic classification, and may result in multiple different taxonomies which may be combined to make the overall classification system. In some cases, an internal taxonomy of audiences may be used for classification and/or feedback on the quality of classification models. Additionally, in some cases, the resource management and classification system 130 may receive and analyze keywords passed in from search engines associated with content resources, to better classify the content resources and/or to evaluate the quality of the machine-learning based classifications.

In step 205, the resource management and classification system 130 may initiate the generation of the hierarchy data structure and on the computing infrastructure. In some cases, system 130 may directly execute the selected classification algorithm on the selected data in order to generate and populate the particular classification hierarchy. In other cases, the system 130 might only initiate the generation of the hierarchy data structure, for example, by instructing the designated server to generate the hierarchy. As noted above, different application servers 120, storage systems 125, clients, and/or other network devices may independently build and store their own respective classification hierarchies in some cases. Alternatively or additionally, the resource management and classification system 130 may directly or indirectly generate the hierarchies by assigning different data partitions and different classification algorithms to different computing infrastructures (e.g., servers and/or different underlying physical storage systems). For instance, the system 130 may select a different server for each data partition, and then may initiate the generation of a unique classification hierarchy on that server by transmitting an initial classification framework to the server, providing the server with the selected machine-learning algorithm (or other algorithm) to build-out the classification hierarchy, and then directing the server to execute the machine-learning algorithm on its assigned data partition (which may or may not reside on that server).

For the selection of the machine-learning algorithms in step 204, and the generation of the hierarchy data structure using the selected machine-learning algorithms in step 205, a number of different types of machine-learning algorithms may be implemented in various embodiments. In some embodiments, the processes of analyzing and classifying content resources such as web pages and other web-based resources may include a first preprocessing stage and a second topic classification stage, discussed below.

During a preprocessing stage of a classification process in step 205, one or more machine-learning algorithms such as article extraction (or content extraction) algorithms and/or BM25f algorithms may be used. Content extraction algorithms may be designed to identify the parts of a webpage that contain the main textual content, while determining and ignoring the additional contextual items such as menus, status bars, advertisements, and the like. Determining the main textual block of a webpage may provide technical advantages during the classification process performed in step 205, for example, by increasing the performance of the classification process and ensuring a more accurate classification by only analyzing the most relevant information on the web page. In some embodiments, a content extraction algorithm may combine several techniques, such as content code blurring, and using tag ratios, as well as using the Document Object Model (DOM) tree information from the web page, to provide the most accurate content extraction of a web page. For example, certain content extract techniques selected and applied by the resource management and classification system 130 may include determining a chars-node-ratio (CNR) corresponding to the ratio between text content and tags without each node of the DOM tree of a web page. The CNR of an internal node may take into account all the text and tags included in its descendant, and is useful in that it allows detection of blocks of relevant content even if some nodes without text belong to the block. Such an algorithm may include initially computing the CNR for each node in the DOM tree of the web page, then selecting the nodes with a higher CNR and, starting with those nodes, traversing the DOM tree bottom-up to identify the best container nodes (e.g., tables, DIVS, etc.) which contain more relevant text and less nodes. Each of these container nodes may represents an HTML block. The computation of CNRs may be done with a cumulative and recursive process that traverses the DOM tree and count the text and descendants of each node. The algorithm may then select the block(s) with relatively more relevant content. For instance, the algorithm may recursively obtain the CNR of each node starting at the root node of the DOM tree, and then at each node add three new attributes to the node with a computed weight of the node, the number of characters the node contains, and the CNR of the node. The number of characters may be computed ignoring special characters such as spaces or line breaks, in order to make the algorithm independent of the formatting of the webpage. After the CNRs have been calculated for the web page, the algorithm may select the nodes having a higher CNR, and then may propagate those nodes bottom up to discover the blocks to which they belong, and then select the block with more text. Therefore, if any nodes not belonging to the main block are included in the selected nodes, they will be discarded in the next steps. A separate algorithm may be used to compute the container blocks, in which all of the descendent nodes of the set of nodes identified in the previous step are removed, after which the algorithm proceed bottom-up in the tree by discarding any sibling nodes and collecting the parent node until a fix point is reached in the DOM tree. This combination of steps of a CNR algorithm may thus produce a final set of nodes that represent the blocks in the webpage. From these nodes, the algorithm may finally select the nodes that contains more text (in the subtree rooted at that node) as the final block. This algorithm comprises additional advantages in that the algorithm can be performed at a linear cost based on the size of the DOM tree of the web page.

Additionally or alternatively, a BM25f ranking function algorithm may be used during the preprocessing stage of a classification process for a web page or other content resource in some implementations of step 205. BM25f includes retrieval of the structural information of a document (e.g., web page), in order to compute a score of the document. In particular, BM25F is an extension of the BM25 ranking function adapted to score structured documents. The BM25 is a ranking function based on a Vector Space Model (VSM) relevance score function for a documents. In some embodiments, the BM25F may calculate a normalized term frequency for each field of the document, and then combining the term frequencies linearly using a boost factor. The final BM25f ranking of the document then may be computed using a BM25 saturation equation. Similar content extract techniques also may be applied to non-web page content, such as documents, media files, etc.

Following the preprocessing of a document during a two-stage classification process in step 205, one or more additional machine-learning algorithms may be used to perform the topic classification. In some embodiments, a LIBLINEAR classification algorithm may be used to perform a topic classification in step 205. LIBLINEAR is based on an open source library for large-scale linear classification. In some examples used herein, a LIBLINEAR classification algorithm may include L2-regularized logistic regression (LR), L2-loss and L1-loss linear support vector machines (SVMs). Such implementations of LIBLINEAR used in step 205 also may support simple usage, rich documentation, and open source license view LIBSVM. Both the LIBLINEAR methods of LR and SVM may solve the same unconstrained optimization problem with different loss functions: SVM may use one or more predetermined loss functions (e.g., L1-SVM or L2-SVM), while the loss function for LR may be derived from a probabilistic model. The approach for L1-SVM and L2-SVM may be a coordinate descent method, and for both LR and L2-SVM, LIBLINEAR may implement a trust region Newton method. Ultimately, such implementations of LIBLINEAR in step 205 may provide technical advantages in solving large-scale classification of web pages or other content resources, especially in embodiments where LIBLINEAR machine-learning techniques are used for large spared data with very large numbers of instances and features.

Additionally or alternatively, during a topic classification stage for a web page or other content resource in step 205, the resource management and classification system 130 may use a bag-of-words (BOW) vector space model algorithm. BOW models may be implemented by system 130 to perform pattern matching within and between the different web pages (or other content resources) in the assigned data set. In a BOW approach, the histogram of the words within a document are analyzed, and each word count is considered as feature. For example, the resource management and classification system 130 may define a model vocabulary for the set of content resources, and then score the words in each data to transform the document into a document vector which may be used as input or output into a machine learning model. In some embodiments, one or more preprocessing algorithms (discussed above) may be used prior to a BOW classification algorithm, in order to reduce the vocabulary and thereby save memory and computing resources required for the BOW classification. Additionally, in some examples, the model vocabulary may be developed to include grouped words or phrases, rather than individual words only, both to increase computational efficiency and to provide more meaning/context to the textual overlap in documents. The scoring of a web page (or other content resource) using the BOW algorithm may include one or both of a word count or word frequency analysis. Additionally, hash representations of words in the vocabulary may be used, and words may be hashed deterministically to the same integer index in the target hash space, thereby allowing for a binary score or count to be used to score the word. Finally, a Term Frequency-Inverse Document Frequency (TD-IDF) weighted scoring may be applied to score and classifying the document. As noted above, although various techniques herein may be described with reference to classifying web pages, it should be understood that corresponding techniques may be performed to classify other types of content resources (e.g., other Internet-based resources, documents from a document store, multimedia resources, etc.).

In still other examples, neural networks and/or deep learning neural networks may be used for preprocessing and/or topic classification for a web page or other content resource in step 205. In such examples, the resource management and classification system 130 may implement one or more neural network algorithms, including but not limited to a gradient descent algorithm, a conjugate gradient algorithm, a Newton or quasi-Newton algorithm, and/or a damped least-squares algorithm, to perform classification of particular web pages and/or other content resources. For these and other neural network algorithms, the different algorithms may have different requirements for processing speed, memory, and other hardware-based requirements. Therefore, in some embodiments, system 130 may select a particular algorithm based on the numbers of instances and parameters in the preprocessing and/or classification processes, and based on the computing/hardware resources available to the system 130. For deep neural networks, training large-scale and/or complex neural networks (e.g., classifying very large sets of large and complex web pages and/or other content resources) a deep learning cluster may use multiple processors and/or servers so that the network may be trained within a reasonable time period. In some cases, such training processes may be distributed over multiple GPUs and/or CPUs, and/or may use cloud memory and/or proprietary racks.

Further although the above examples describe several different types of machine-learning algorithms and techniques that may be implemented in step 205 to classify sets of content resources within a hierarchy data structure, in other examples one or more non-machine learning algorithms may be used in addition to or alternatively to these machine learning algorithms. For instance, various technical taxonomies, audience taxonomies, intent taxonomies, and the like may be generated based on various different analyses of the content resources (e.g., web pages), such as keyword based algorithms configured to analyze content and/or metadata, search engine referral classification algorithms, etc. In some cases, a technical taxonomy may be one of the underlying classification hierarchies, but a given topic might not fit into the technical taxonomy easily or at all. For example, for topics like lifestyle and activities, it may be very different for a trained machine-learning model to learn precisely what lifestyle and activity are, because these are quite broad topics. Thus, building these topics into a technical taxonomy may result in a high level of false positives, and as a result the technical taxonomy may be built to have several top-level topics and several sub-levels to each topic. Additionally or alternatively, one or more of the classification hierarchies may be generated to implement an audience taxonomy, which may be an intent-based taxonomy. In some cases, the audience taxonomy may be curated based on search keywords, for instance, life moment keywords may be terms such as divorce, graduation, retirement, wedding, and related terms. Thus, an audience taxonomy is more intent-based as opposed to being more topic-based.

Additionally, as discussed above, the resource management and classification system 130 may select/assign different algorithms to be used for generating different hierarchy data structures in steps 202-205. In some embodiments, two or more different machine-learning algorithms may be selected to generate different classification hierarchies, and/or other classification hierarchies may be generated using non-machine learning algorithms. As a result of the combination of the different classification algorithms, and the different data partitions of content resources to be processed and classified using those algorithms, the resulting hierarchy data structures generated in step 205 may have partially or entirely different node structures (e.g., different numbers of levels, arrangements of nodes within levels, child-parent relationships between nodes, etc.).

In steps 206-207, a derivative hierarchy is generated by the resource management and classification system 130, having nodes that reference the nodes from the underlying hierarchy data structures created in steps 202-205. For example, each node in a derivative hierarchy (which may also be referred to as a product hierarchy or virtual hierarchy) may include node mapping data that references other nodes in one or more of the underlying hierarchy data structures generated in steps 202-205, as well as logical rules (e.g., one or more AND or OR logical conjunctions) to defining the scope of data referenced by the node in the derivative hierarchy. Thus, the nodes of the derivative hierarchy need not directly store any of the data relating to any of the content resource classifications performed in steps 202-205, but instead might only store logical rules and/or data mappings referencing the underlying nodes.

The node structure and node mapping data determined in step 206 may be define and/or modified manually based on user input, or may be determined automatically via programmatic processes (e.g., by testing and scoring the underlying hierarchies and/or previous node mapping combinations, etc.). Certain node mappings defined in step 206 may be simple, such as a one-to-one mapping between a node in the derivative hierarchy and a single node in one of the underlying hierarchies. In this example, every time the node in the derivative hierarchy is retrieved, the node mapping data (e.g., data identifying a remote server, network credentials, a data store, a hierarchy name, a node name, and/or a node path) may direct the system 130 to access the node referenced in the mapping from the underlying hierarchy. For instance, in implementations when the hierarchies (including the derivative hierarchy) correspond to a classification topic taxonomy for web pages (or other content), a topic query of the node from the derivative hierarchy may return the corresponding topic and/or list of web pages classified under that topic, from the mapped node in the underlying hierarchy.

In other examples, the node mappings may be more complex. For example, a single node in the derivative hierarchy may be mapped to one or multiple nodes across multiple different underlying hierarchy data structures. In these examples, the mapping data may include logical conjunction rules (e.g., ANDing or ORing rules). If a topic query is received for a node in the derivative hierarchy that is mapped to two (or more) different "ANDed" nodes in the underlying hierarchies, then the query may return the corresponding topics and/or a list of web pages only found in both (or all) of the mapped nodes in the underlying hierarchies. In contrast, if a topic query is received for a node in the derivative hierarchy that is mapped to two (or more) different "ORed" nodes in the underlying hierarchies, then the query may return the corresponding topics and/or a list of web pages only found in either (or any) of the mapped nodes in the underlying hierarchies. In still other examples, the node mapping data may include more complex logical conjunctions including multiple nested ANDs and/or ORs to precisely define the set of underlying content resource data associated with particular nodes in the top-level derivative hierarchy.

As noted above, the top-level derivative hierarchy generated in step 207 need not be a physical hierarchy (e.g., need not include a physical tree or other data structure), but instead might only include a set of logical rules for processing classification and data retrieval requests, and for accessing the underlying classification hierarchies generated in step 205. The rules implemented by the logical layer of the top-level hierarchy may be hardcoded rules, keyword-based rules, or rules based on trained machine-learning models and/or feedback. For example, the rules implemented in step 207 may be rules selecting a particular underlying classification hierarchy over another classification hierarchy for certain types of requests (e.g., requests from certain client devices, requests at certain times, requests within certain branches and/or having certain keywords, etc.), so that those requests are routed to the selected classification hierarchy. Other types of rules may call for the resource classification system 130 to access and analyze corresponding nodes/levels/branches from multiple different classification hierarchies, thereby bringing in data points from different classification hierarchies which can be mapped to the single universal hierarchy.

Figure 3:
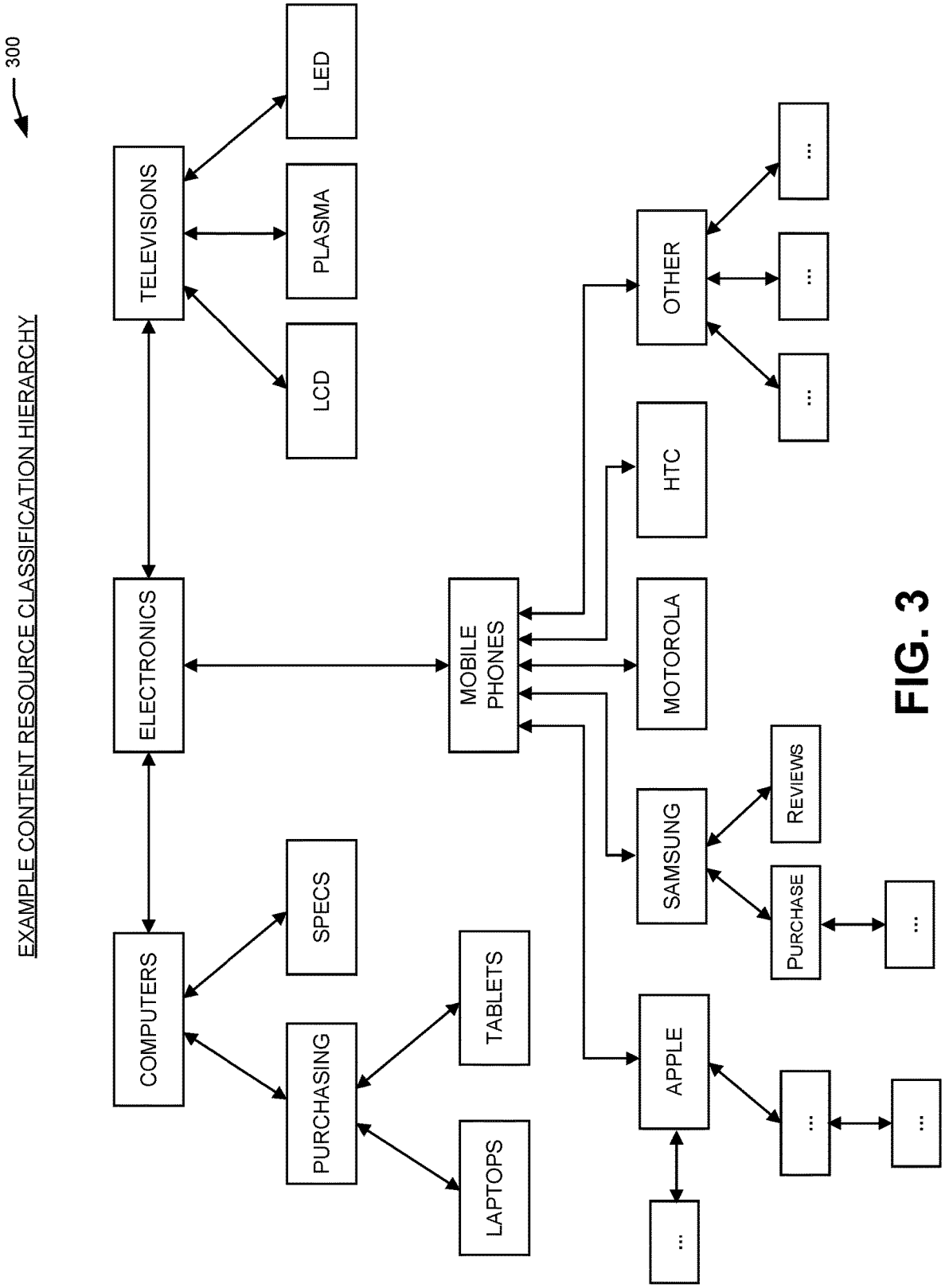
FIG. 3 is a partial example of a content resource classification hierarchy relating to electronics, in accordance with certain embodiments of the present disclosure.

Referring now to FIG. 3, a tree diagram is shown illustrating a portion of an example classification hierarchy 300, based on an analysis of a set of web pages (or other content resources). The portion of a classification hierarchy shown in this example relates to topic classification for electronic products, and the levels and nodes within the classification hierarchy represent categories and/or sub-classes into which different web pages may be classified. As discussed above, classification hierarchies like hierarchy 300 in this example may represent the results of machine learning algorithms and other classification techniques performed on a data partition including web pages and/or web-browsing data from network sessions. Different hierarchy data structures may be generated based on different analyses of the resources (e.g., web pages) using any of the various different machine learning (and/or non-machine learning) algorithms discussed above.

Figure 4:
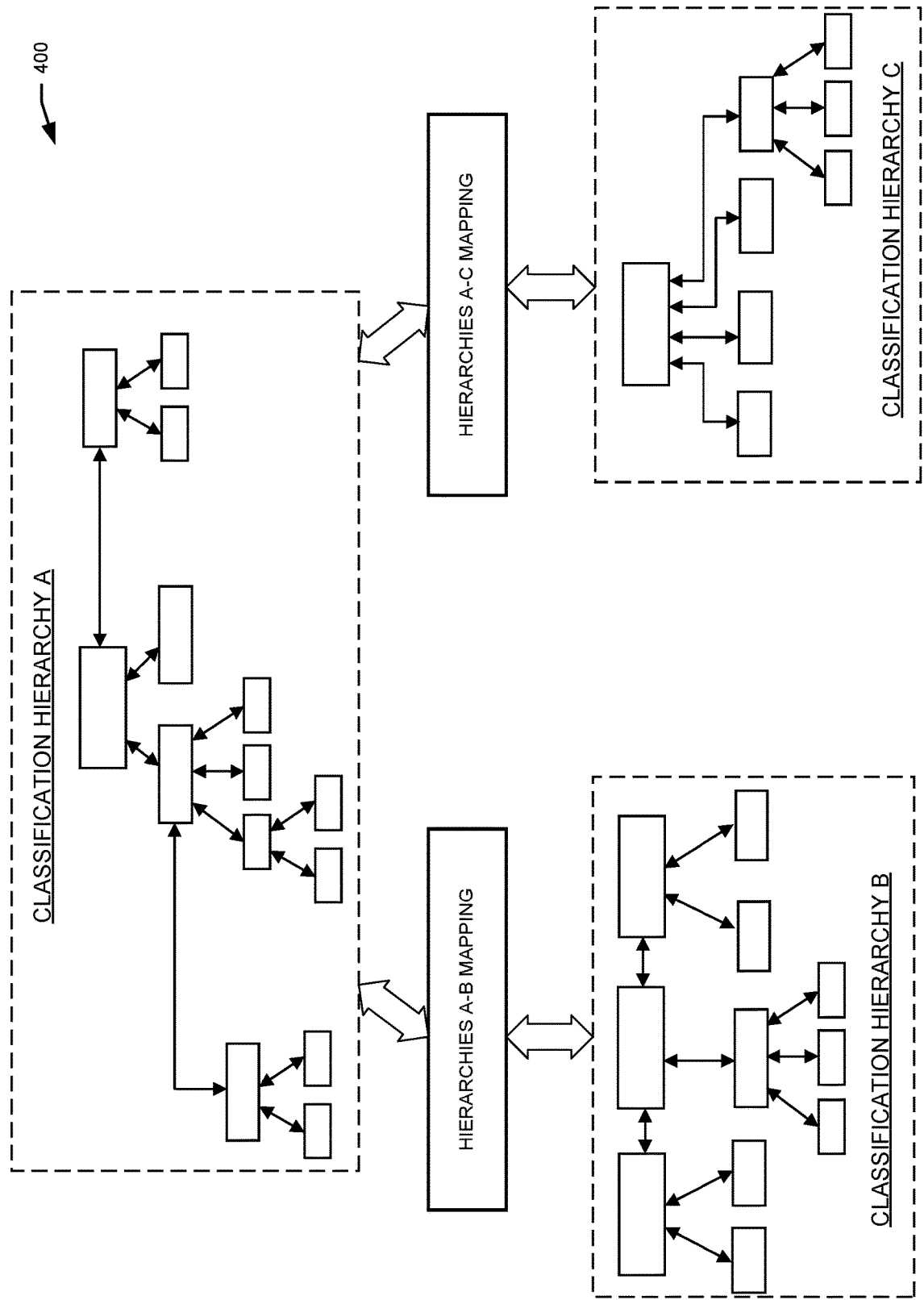
FIG. 4 is a block diagram illustrating mappings between two underlying hierarchy data structures and a derivative classification hierarchy, in accordance with certain embodiments of the present disclosure.

Referring now to FIG. 4, a diagram is shown illustrating three different classification hierarchies, along with corresponding sets of node mapping data between each of the underlying hierarchies (B and C) and the top-level hierarchy (A). In this example, hierarchy data structures B and C may represent different classification hierarchies generated using steps 202-205 discussed above, and hierarchy data structure A may be derivative hierarchy (or product or virtual hierarchy) generated using steps 206 and 207. Classification hierarchies B and C may be, for example, the generated result of two different machine-learning models executed either on the same/related sets of content resources (e.g., web pages), or on different subsets of the content resources as discussed above. As shown in this example, the different classification hierarchies may have different numbers of levels, and different configurations and relationships of levels and nodes within the tree-structure hierarchy. Mappings may be determined and stored between the individual nodes in the top-level hierarchy A, and different combinations of individual nodes in the other hierarchies B and C. As noted above, such mappings may be one-to-one, many-to-one, or one-to-many, etc. As discussed below, the mappings that determine the outputs received from classification hierarchy A may cause any classification updates or new data (topics or resources) hierarchies B or C to be immediately reflected by the derivative hierarchy A, so that any queries or access requests to the derivative hierarchy will automatically return data based on the most recent updated mapped nodes in classification hierarchies B and C.

Figure 5:
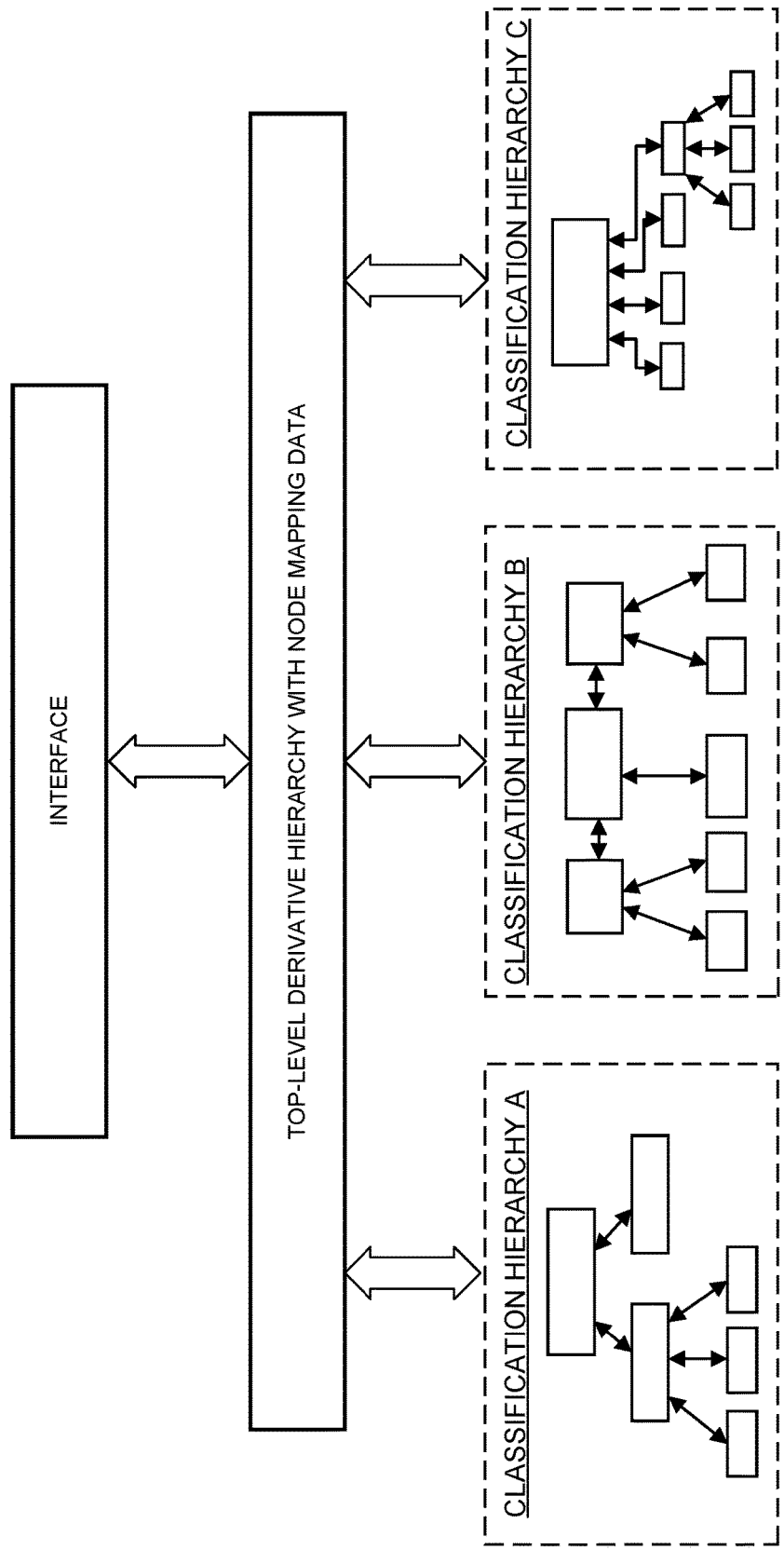
FIG. 5 is a block diagram illustrating a computing interface to a derivative classification hierarchy with mappings to three underlying hierarchy data structures, in accordance with certain embodiments of the present disclosure.

Referring now to FIG. 5, another diagram is shown illustrating a top-level derivative classification hierarchy in communication with three different underlying classification hierarchy data structures. As discussed below, a logical layer consisting of node mapping data may be determined to form the top-level classification hierarchy, which also may be used to respond to various classification requests. Such a top-level classification hierarchy may be referred to a virtual hierarchy in that it need not (buy still may) be stored as a physical hierarchical data structure, but instead might include only placeholder nodes and the set of logical processing rules configured to access one or more of the data structures of the underlying classification hierarchies. In some cases, rules within the logical layer of the top-level hierarchy may be configured to access each of the different underlying classification hierarchies in different scenarios based on different inputs. As an example, certain classification requests and topic or resource retrieval requests may be received by the resource management and classification system 130 via the interface, and after processing with the derivative hierarchy, may be directed to Classification Hierarchy A, while others are directed to Classification Hierarchy B, others are directed to Classification Hierarchy C, and still other requests may be served based on a combination of data from multiple of Classification Hierarchies A-C, etc. The node mapping data implemented by the logical layer of the top-level hierarchy may be hardcoded rules, keyword-based rules, or rules based on trained machine-learning models and/or feedback.

Additional technical advantages of using a derivative hierarchy with logical layer of node mapping data relates to the frequency at which the data within underlying hierarchy data structures, and/or the computing environments of those underlying hierarchy data structures may change. For example, for data sets of web-browsing session data, when the web page data may change consistently as new pages are added to web sites and old pages removed, it may be inefficient on the back-end to keep changing the classification hierarchies each time the underlying web pages are changed. Accordingly, the top logical layer may act as a fluid layer on top of the underlying hierarchies (or taxonomies), such that the system 130 may have the flexibility to accommodate such change by simply modifying the logical layer, without requiring any modification to or a regeneration of any of the underlying hierarchy structures.

As an example, the underlying classification hierarchies may represent multiple different machine-learning algorithms and/or other classification algorithms (e.g., an intent taxonomy, a topic taxonomy, and a technical taxonomy). If a request received by the resource management and classification system 130 indicates that a system user is interested in a particular topic (e.g., basketball), a first underlying hierarchy may have very little information about basketball, while a second underlying hierarchy may have significant information about the topic (e.g., including subtopics, recommend web pages, etc.). In this case, the derivative hierarchy including the logical layer, using the resource classification system 130, may potentially bring in the data from the two different in the two different hierarchies, so a given URL would be sent to a first hierarchy (e.g., under sports by type NCAA basketball) where the URL could be classified into the topic. Thereafter, if a resource classification request is received for this topic, the resource management and classification system 130 might not want the basketball topic at level two or three because the focus is on basketball specifically, so it could create a new logical node for the topic "basketball" at level one in the derivative taxonomy (e.g., the top-level logical hierarchy), without affecting the structures in the underlying data hierarchies. As another example of a derivative hierarchy may be used to mask the underlying hierarchies, a high-value publisher of web-based content may request that even if its home page is classified under one topic (e.g., cooking), that classification should be overridden so that the home page is classified under a different topic (e.g., retail). This reclassification may be implemented using hardcoded rules in the node mapping data of the derivative hierarchy, without affecting any of the underlying hierarchies which may be costly to modify, manipulate, or regenerate.

Figure 6A:
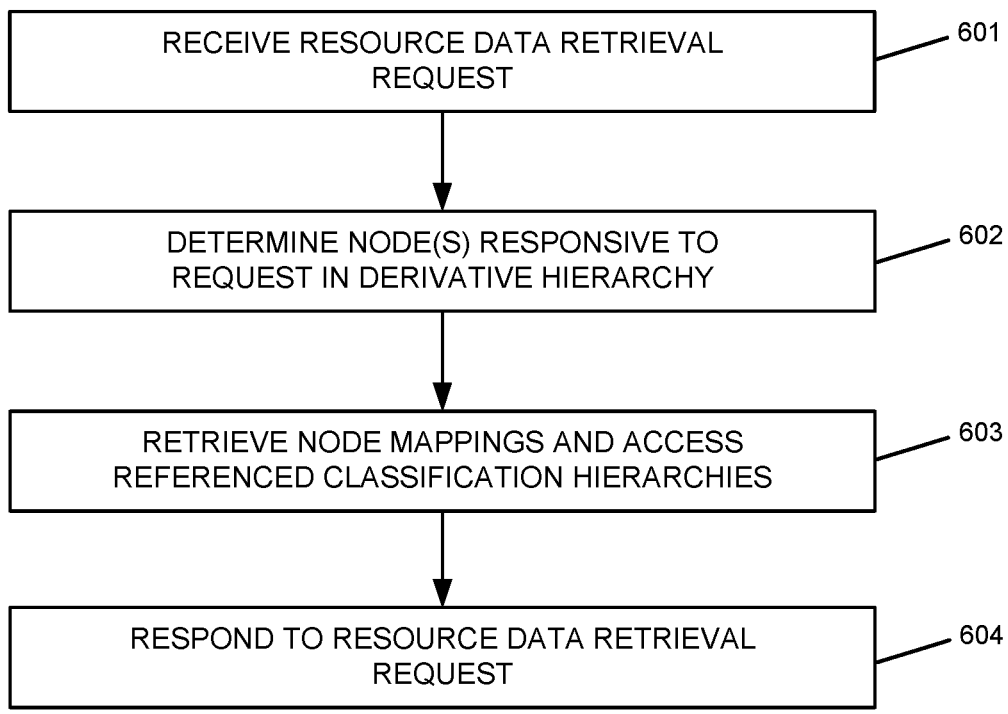
FIGS. 6A and 6B are block diagrams illustrating example processes of receiving and responding to requests relating to a derivative classification hierarchy, in accordance with certain embodiments of the present disclosure.
Figure 6B:
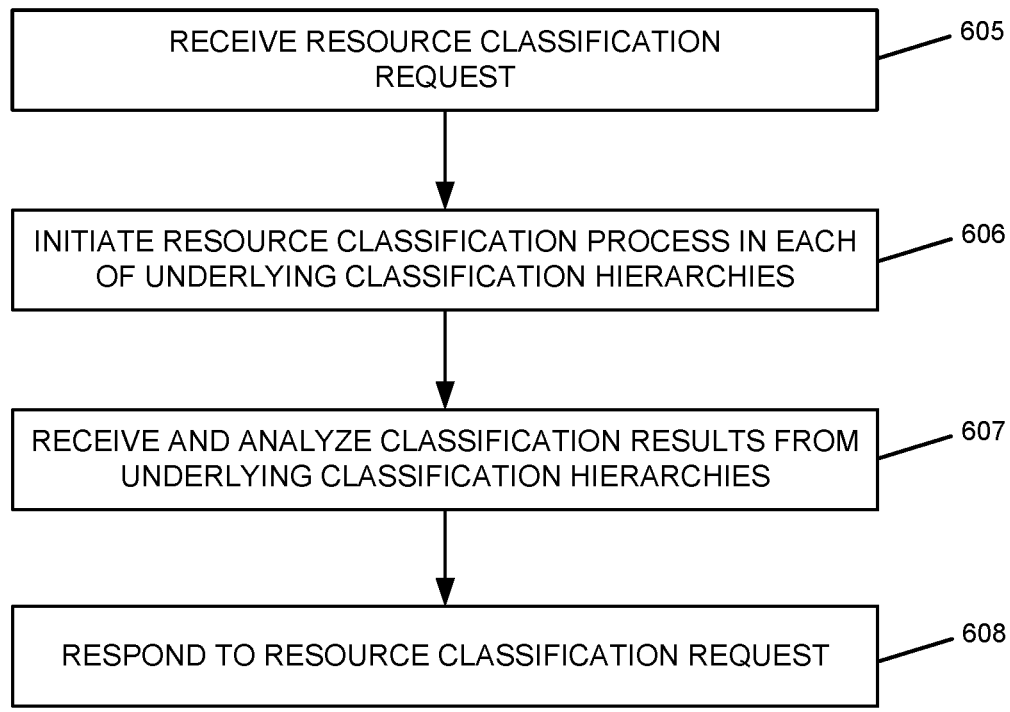

Referring now to FIGS. 6A and 6B, two flow diagrams are shown illustrating example methods of receiving and responding to data retrieval requests and resource classification requests processes via a derivative classification hierarchy. As described below, the steps in these processes may be performed by one or more components in the resource management and classification system 130, including distributed data storage and processing systems. However, it should be understood that process steps such as receiving and analyzing content resources, retrieving and updating node mapping data between classification hierarchies need not be limited to the specific systems and hardware implementations described above, but may be performed within other computing environments comprising other combinations of the hardware and software components described herein.

Referring now to FIG. 6A, this example illustrates a method of receiving and responding to a request to retrieve certain resource content data via a derivative hierarchy mapped to one or more underlying classification hierarchies. For example, for embodiments such as those discussed above, where the derivative hierarchy and underlying hierarchies are topic classification taxonomies, the request received in step 601 may identify a particular topic (e.g., category) of content resources, and may seek to retrieve additional information related to the input topic. For instance, a client (e.g., a system user or programmatic process) may transmit a request to the system 130 via a programmatic interface, the request identifying a particular content category or topic. Examples of such input topics may include any possible topic or category into which web pages, documents, or other content resources may be classified, for instance, "Super Bowl," "Solar Eclipse," "Basketball Shoes," "Home Gardening," "Vegan Recipes," "Cheap Flights," or any other possible classification topic.

In some types of requests in step 601, the data requested may be related topics from the underlying classification hierarchies. For example, the client initiating the request may provide and input topic, and may seek to identify one or more additional topics that may be of interest to users who have expressed interest in the particular input topic. In other types of requests, the data requested may be a set of web pages or websites classified within the input, from the underlying classification hierarchies. For example, the client initiating the request may provide an input topic, and may receive as output one or more recommended web pages or web sites that correspond to the input topic. In still other types of requests, the data requested may be a set of system users associated with the input. For example, the client initiating the request may provide an input topic, and may receive as output a set of users, retrieved from the underlying classification hierarchies, that are associated with the input topic (e.g., have accessed a threshold number of content resources related to the topic). Still other requests may identify a website, domain, content publisher, etc., as input, and may request the data/statistics regarding the classification of the different resources (e.g., web pages) of the input. In these examples and others, the resource classification request may depend on data within one or more of the classification hierarchies.

For the types of example of requests described above, the input received in step 601 may comprise a single topic, or multiple topics. That is, in some embodiments, the system 130 may support requests to retrieve a set of topics, content resources, and/or users that are associated with a combination of input topics. For instance, the requesting client user may provide multiple input topics in step 601, which may be related (e.g., "shoes" and "golf") or may be seemingly unrelated (e.g., "gardening" and "basketball"), in order to use the derivative hierarchy to retrieve and analyze (e.g., by aggregating results, logical conjunctions, etc.) results from underlying classification hierarchies of both input topics. As a result, the derivative hierarchy may allow clients to retrieve topics of interest, web page/document recommendations, and/or a set of target users, that are associated with the some or all of the multiple different input topics.

To process any of the above examples of requests received in step 601, the resource management and classification system 130 may initially determine one or more topic nodes in the derivative hierarchy that correspond to the input topics, in step 602. In step 603, the system 130 may retrieve the node mapping data for each of the derivative hierarchy nodes identified in step 602, and may use the node mapping data to access and retrieve corresponding data from the mapped nodes of the underlying classification hierarchy data structures. Finally, in step 604, the system 130 may process the responses received from each of the underlying data hierarchies, and may return the results to the requesting client. As noted above, the processing of the results in the step 604 may include, for example, aggregating results, determining overlapping results, and/or ranking the results received from multiple different underlying hierarchies, before formatting and returning those results to the client device.

Referring now to FIG. 6B, another example method is shown for receiving and responding to resource classification requests, via a derivative hierarchy mapped to one or more underlying classification hierarchies. In this example, the request received in step 605 may include data identifying one or more content resources, such as a URLs or web pages, documents, etc. In step 606, the resource management and classification system 130 may process the input and then initiate a corresponding resource classification process in each of the underlying classification hierarchies. In some examples, the system 130 may forward the input document(s) received in step 605 to each of the underlying hierarchies for classification. The system 130 may or may not perform preprocessing steps on the input documents, and in some cases, may select only a single underlying hierarchy or a small subset of the underlying hierarchies, rather than initiating a resource classification at each of the underlying hierarchies.

In step 607, the system 130 may receive back classification results from the underlying classification hierarchies. As discussed in detail above, each underlying classification hierarchy data structure may be generated using unique subsets of data and/or different machine-learning (or non-machine learning) algorithms, and therefore the underlying classification hierarchies may return different results to the classification request in step 607. In step 608, the system 130 may process the responses received from each of the underlying data hierarchies, and may return the results to the requesting client. As noted above, the processing of the results in the step 608 may include, for example, aggregating the results (e.g., a list of combined classification topics), determining overlapping results, and/or ranking the results received from multiple different underlying hierarchies, before formatting and returning those results to the client device.

Additionally, in still other examples, the system 130 may be configured to support client requests to modify the derivative hierarchy. For example, an authorized client may request to add or remove nodes from the derivative hierarchy, and/or to define or modify the node mapping data of any node, including which underlying nodes are mapped to which derivative hierarchy nodes, and/or the logical rules (e.g., ANDing and ORing relationships, or weight values associated with each different mapping relationship) associated with each node mapping. As discussed above, a number of technical advantages may result from this functionality, including providing clients the ability to customize a derivative hierarchy for a particular purpose without having to perform a costly regeneration or modification to any of the underlying classification hierarchy structures. One example of this may be a search engine or targeted advertising campaign that was targeted toward a specific segment of the user population with a unique and/or unconventional interest profile (e.g., users interested in both Topic A and an entirely unrelated Topic B). Additionally, the ability to perform low-cost modifications to the derivative hierarchy may also the system 130 to evaluate the performance of results provided by the derivative hierarchy (e.g., the accuracy of the resource classifications, the quality of the responses for related topics, web pages, or users, etc.), and then adjust the nodes and node mapping data of the derivative hierarchy to improve the performance dynamically in run-time, without needing to alter or even inform the underlying hierarchies. Thus, the quality and performance tuning may be performed much more efficiently than by having to rebuild, retrain, and/or regenerate any of the large-scale underlying hierarchy data structures.

In some use cases, the requests received in steps 601 and/or 605 may be initiated automatically during a user networking session, for example, when a user accesses a particular URL during a web-browsing session. For instance, when the user requests a particular webpage, a resource classification request may be initiated (step 605) on the requested webpage, and the output from the request (step 608) may be one or more content categories/topics in which the user may have interest. Thus, following step 608, an association may be stored between the particular user and the classification topic within a Data-as-a-Service (DaaS) platform, so that when subsequent interaction involving the same user are detected (e.g., a subsequent web-browsing session), then the association between the user and the classification topic may be retrieved and the user's subsequent web-browsing session may be customized based on the previously-identified categories/topics of interest to the user.

Additional aspects described herein relate to generating, storing, and accessing the underlying classification hierarchy data structures, using distributed data storage and processing techniques. For example, a HYDRA® open source distributed processing platform may be used to generate, store, maintain, and access classification hierarchies in some embodiments. In such cases, the distributed data storage and processing components of the resource management and classification system 130 may use a tree (or hierarchy) as a primary data structure. Distributed clustering algorithms also may be used to perform updates and queries on the set of content hierarchy trees.

Figure 7:
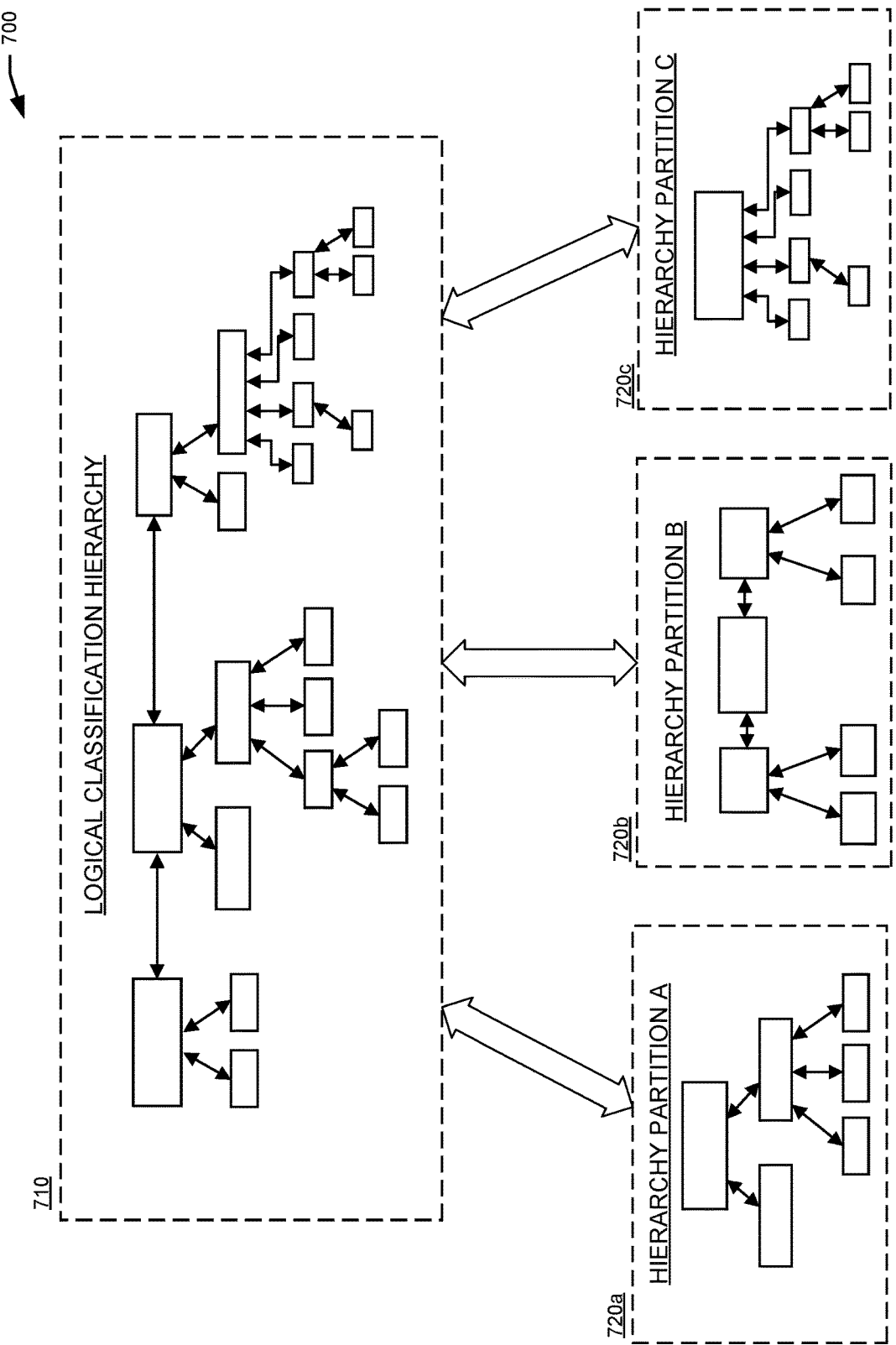
FIG. 7 is a block diagram illustrating mappings between three underlying hierarchy data structures and a derivative classification hierarchy, in accordance with certain embodiments of the present disclosure.

Referring now to FIG. 7, an example is shown of a single classification hierarchy data structure 710 which is implemented based on a combination of multiple underlying physical hierarchy partitions 720. In this example, the distributed tree structure 710 may correspond to a single classification hierarchy data structure, but may be sharded (or partitioned) into multiple different hierarchy/taxonomy portions (or partitions) 720, so that particular keys/nodes are stored within particular instances 720 of the overall hierarchy/tree structure 710. Thus, in these implementations, none of the individual partitions 720a-720c may include all of the keys/nodes of the overall classification hierarchy 710, and any updates or requests to retrieve data from the classification hierarchy 710 may be performed by routing the request to the appropriate instance(s) 720 of the hierarchy/tree structure. Such techniques may provide technical advantages of improving the performance of request-response operations to a derivative hierarchy, and/or limiting the size for the tree instances. Further, techniques for load distribution may fit within the various content classification systems described herein, as the processing distribution logic may mirror the same classification logic.

Figure 8:
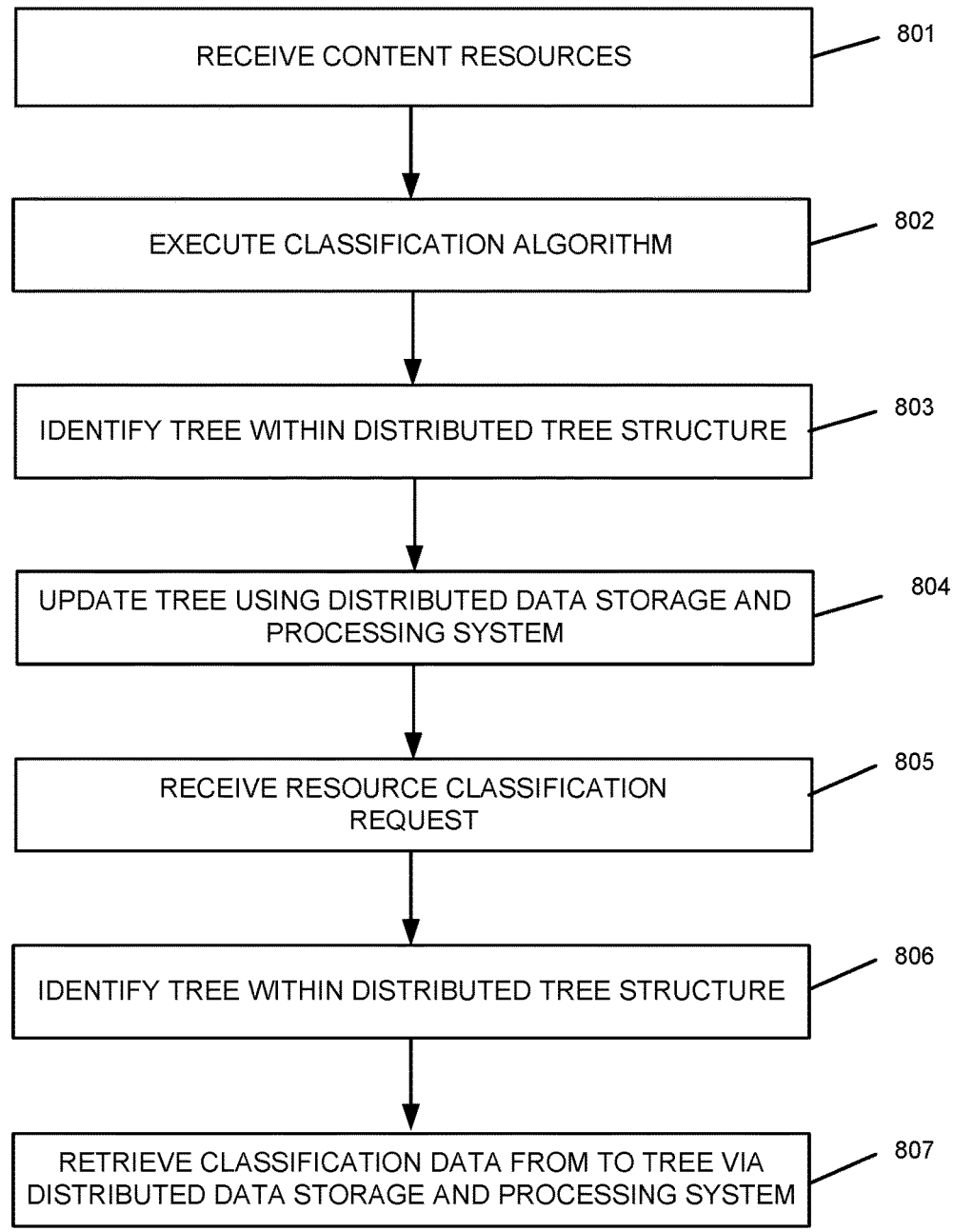
FIG. 8 is a block diagram illustrating an example process of updating a partitioned classification hierarchy and responding to classification requests within a partitioned classification hierarchy, in accordance with certain embodiments of the present disclosure.

Referring now to FIG. 8, a flow diagram is shown illustrating an example method of updating a partitioned classification hierarchy tree and responding to classification requests within a partitioned classification hierarchy. As described below, the steps in this process may be performed by one or more components in the resource management and classification system 130, including distributed data storage and processing systems. However, it should be understood that process steps described herein need not be limited to the specific systems and hardware implementations described above, but may be performed within other computing environments comprising other combinations of the hardware and software components described herein.

In step 801, the resource management and classification system 130 may receive resource contents from one or more data sources. For example, content resources such as web pages or other documents may be received application servers 120, back-end storage systems 125, and/or any other data sources. In step 802, the system 130 may execute one or more machine-learning classification algorithms (and/or non-machine learning algorithms) to analyze and classify the content resources received in step 801. In step 803, before the new content resources (e.g., web pages) may be added into the partitioned classification hierarchy 710, the resource classification system 130 first may determine which partition (or tree) 720 within the distributed tree structure will store the data corresponding to the content resource. The determination of a partition/tree in step 803 may be based on the node/branch of the content resource, determined in step 802. In step 804, the appropriate partition may be updated to reflect the new content resource. In this way, the distributed tree structure may be maintained without needing to access any of the other partitions of the distributed tree structure during the update.

In step 805, the resource classification system 130 may receive a request relating to the resource classification hierarchies created in step 804. As discussed above, the request may be a request for one or more content resources (e.g., URLs) corresponding to a content classification type, or a request for the content classification type (e.g., node name) of a particular content resource, etc., which may depend on classification data within the distributed classification hierarchy. In step 806, the resource management and classification system 130 may identify the partition (or partitions) within the distributed tree structure storing the relevant data for the request. Thus, step 806 may be similar or identical to step 802. Finally, after retrieving the data from the partition (or partitions) within the distributed tree structure, and determining the response to the resource classification request, the response may be returned to the entity/system from which the request originated (e.g., content designer, content publisher, end user, etc.) in step 807.

As noted above, distributed data processing systems (e.g., HYDRA®) may be used to store and process the data. In some embodiments, distributed data processing systems may be used that have a tree as the primary data structure, and trees are naturally deduplicating. For example, for web host serving a large number of domains (e.g., 15 million domains), to keep track of the number of page requests per URL per day in a table-based system may require either collecting and analyzing all of the logs to count up how the page views for each individual URL, or using a table-based insert process that performs a read to determine whether or not a row already exists and incrementing the row if necessary. Each of these operations are potentially time-consuming and expensive with respect to the computing resources required. To the contrary, in a tree-based data structure, the system 130 may determine whether a URL node already exists on a particular day. If so, the system 130 may simply increment a counter, and if not, the system 130 may ignore it. Thus, a technical advantage in such tree-based systems is that if a URL is seen multiple different times (e.g., 10 million times), it doesn't take up any more space in the data structure. Additionally, the existence of the tree path can be used to efficiently perform additional tasks, such as tracking something that happens at least N times in the tree. Additionally, tree-based joins can be used to create and update the taxonomies/partitions of the classification hierarchy.

As an example in the field of targeted advertising using a distributed data processing system, a resource management and classification system 130 may record data identifying ten thousand users who have previously bought shoes, and a client may request that the system 130 identify one million more users who potentially may be interested in buying shoes. In this example, a distributed data processing system may be used as a data processing layer to build a lookalike modeling system. Specifically, the distributed unsupervised clustering may be used to do an audience modeling component, and a combination of clustering and canopy clustering may be used to perform the unsupervised modeling. In the unsupervised clustering use case, in the first process, the system 130 may aggregate all the behavior data associated with a given usage. For example, a given cookie ID might have a domain such as "food.com," "buy.com," etc. Within the access logs, this data would not be stored in an aggregated fashion, and aggregating this data across a large number of profiles (e.g., 2 billion) may be a difficult task because each cookie ID and all the domains that the cookie ID has visited across the last thirty days would need to be stored (e.g., using the HYDRA® distributed processing platform).

Continuing this example, after the system 130 has determined the behavior data associated with all of these cookie IDs, the next step in the audience modeling system may be to build clusters of profiles. For example, each cluster may correspond to people who are interested in a combination of multiple topics (e.g., basketball+shoes, politics+Washington D.C., gardening+financial planning, etc.). Using audience extension of the audience modeling system, these clusters may be built in a distributed fashion using unsupervised clusters. The distributed processing platform (e.g., HYDRA®) may be used to store all the clusters associated with all of these users. After the clusters and associated individuals are known, the system may next provide a seed (e.g., users who have bought shoes in the past) and use the distributed processing to identify the additional clusters that individuals belong to who have previous purchased shoes. Then, after knowing which clusters that these particular users belong to, the system 130 may retrieve all the users associated with all of these additional clusters, since given clusters might have multiple associated users or cookie IDs. Building this infrastructure tree like data structure across multiple nodes provides the ability to query the clusters in real-time and get back results in human scale time.

As noted above, in some embodiments, the distributed tree structure may be sharded or partitioned so that the particular seed elements go to particular instances of the tree, and so that there is no full manifestation of the logical tree that exists across this distributed plane. The update operations and the query operations also may occur in this distributed fashion, where individual seeds are routed to particular instances of that tree, thus limiting the cardinality of the total size of each of those partition trees because not all trees have all seeds and not all trees have all nodes.

In some use cases, such distributed processing tools described herein may be used to provide analytics to content publishers at a large scale (e.g., 50 million publishers, which may desire different metrics relating to billions of nodes, by day, by hour, etc.), so the cardinality of nodes may become very high. In some cases, data may be partitioned by domain, so that across all of the distributed network each domain may be routed to one and only one physical representation of that tree so that you keep down the cardinality of each instance. However, in cases where some domains are huge compared to others (e.g., certain domains may get a million times more page views than other domains) which may result in too much processing on a single node inside of the distributed processing system. In such cases, a second layer of partitioning may be generated, so that the data may be partitioned by domain, but for domains that have certain size thresholds, data may be partitioned by URL and/or by other metrics that may more evenly distribute the data.

Figure 9:
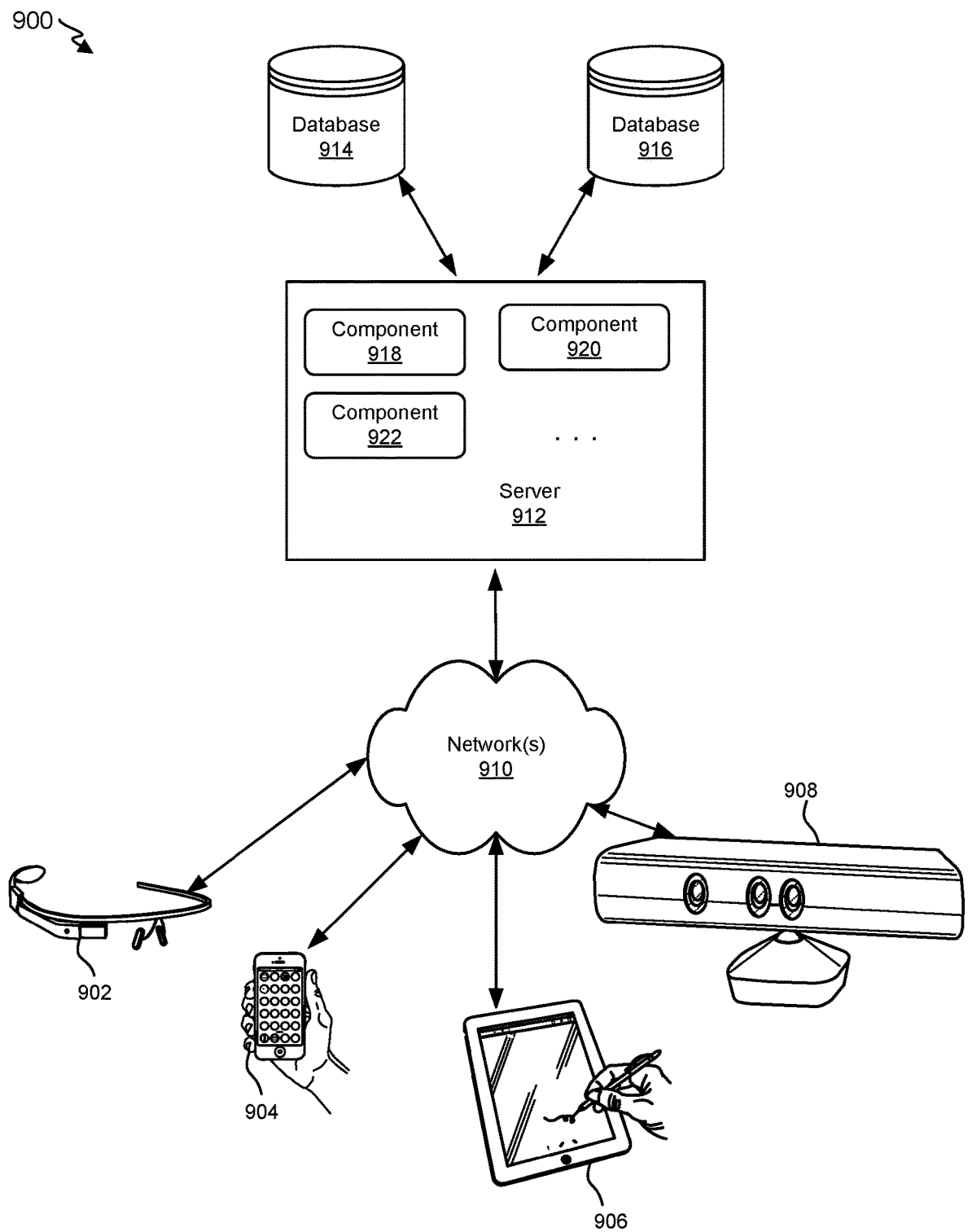
FIG. 9 depicts a simplified diagram of a distributed system for implementing certain embodiments in accordance with present disclosure.

Referring now to FIG. 9, a simplified diagram of a distributed system 900 is depicted for implementing various embodiments described herein. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
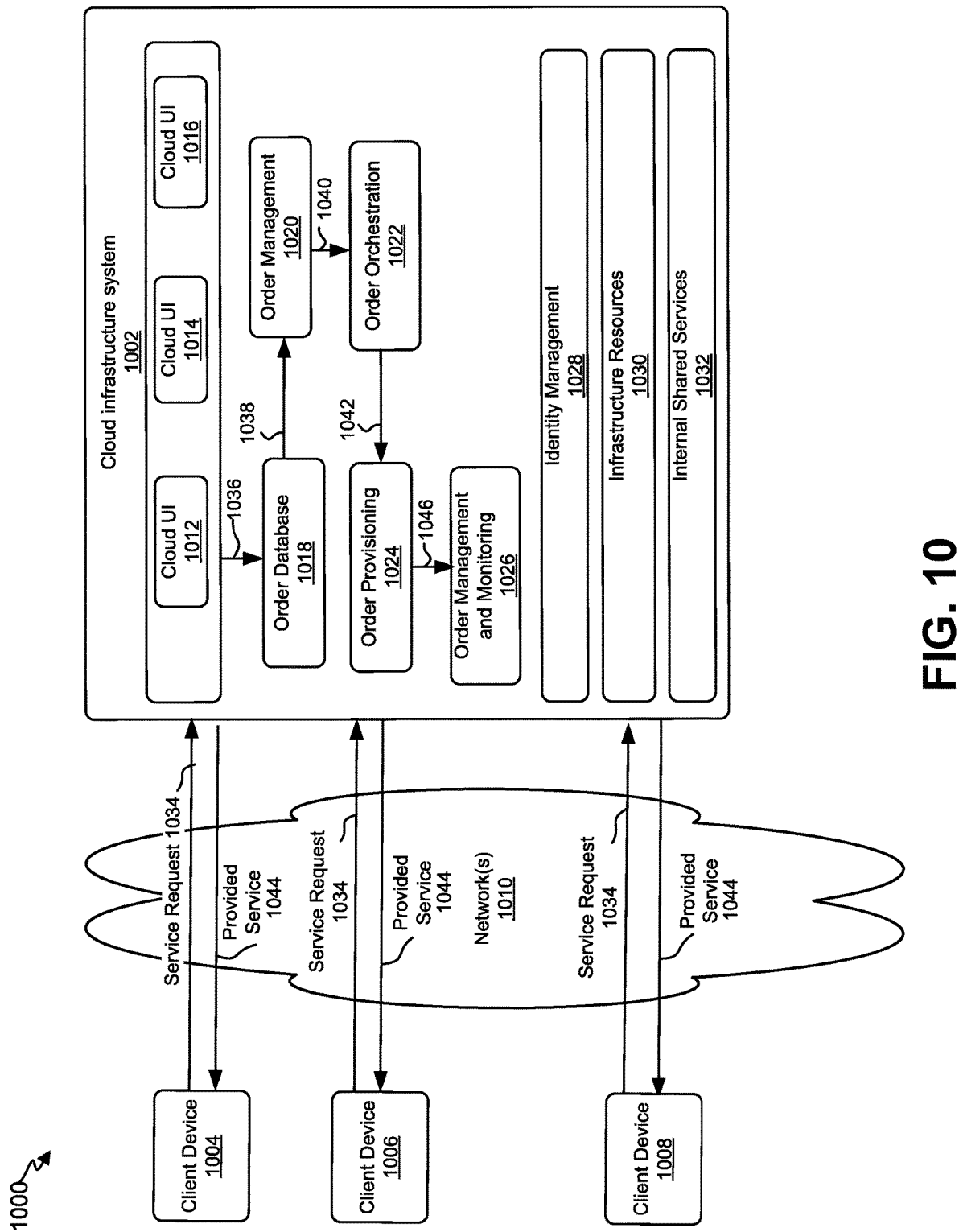
FIG. 10 is a simplified block diagram of one or more components of a system environment by which services provided by one or more components of a system may be offered as cloud services, in accordance with certain embodiments of the present disclosure.

Referring now to FIG. 10, a simplified block diagram is shown including components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 1002, 1004, 1006, and 1008.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 1010.

Cloud infrastructure system 1002 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community.

The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
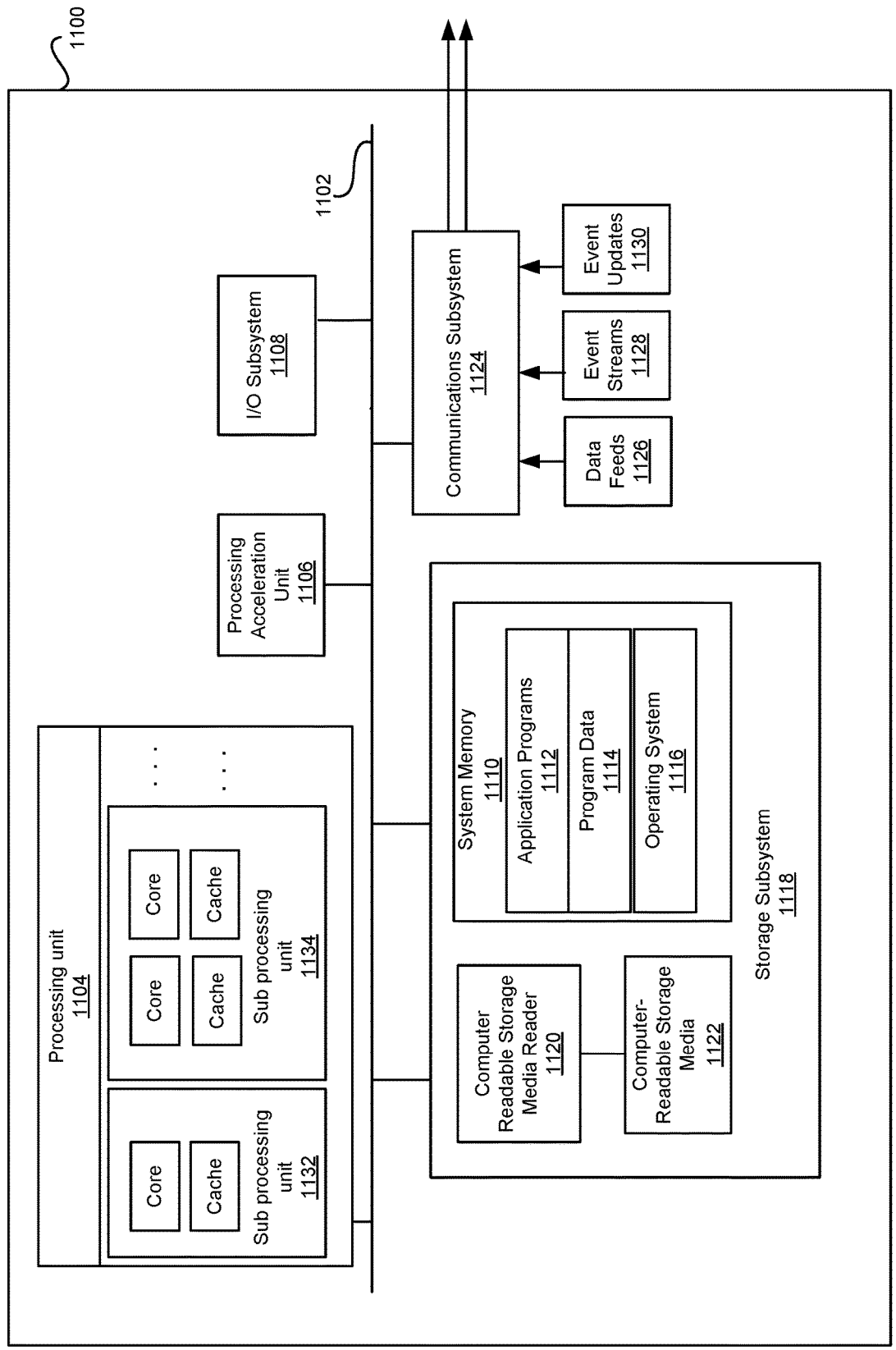
FIG. 11 illustrates an exemplary computer system, in which various embodiments of the present invention may be implemented.

Referring now to FIG. 11, an illustrative computer system 1100 is depicted, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
generating a first hierarchical data structure within a first physical data storage, the first hierarchical data structure comprising a first plurality of nodes arranged within multiple logical levels, wherein an arrangement of one or more nodes of the first plurality of nodes into the multiple logical levels of the first hierarchical data structure is determined by executing a first machine-learning algorithm on a first data set, wherein each of the first plurality of nodes stores data corresponding to a first set of content resources accessed during one or more network sessions, and wherein the first machine-learning algorithm is selected based at least in part on a first number of computing resources available to process the first data set to generate the first hierarchical data structure;
generating a second hierarchical data structure within a second physical data storage, the second hierarchical data structure comprising a second plurality of nodes arranged within multiple logical levels, wherein an arrangement of one or more nodes of the second plurality of nodes into the multiple logical levels of the second hierarchical data structure is determined by executing a second algorithm on a second data set, wherein the second algorithm is different from the first machine-learning algorithm, wherein each of the second plurality of nodes stores data corresponding to a second set of content resources accessed during one or more network sessions, wherein the second algorithm is selected based at least in part on a second number of computing resources available to process the second data set to generate the second hierarchical data structure, and wherein the arrangement of the first plurality of nodes is different from the arrangement of the second plurality of nodes;
generating a third hierarchical data structure, the third hierarchical data structure comprising a third plurality of nodes, wherein the third hierarchical data structure includes a plurality of node mapping data, each node mapping data defining an association between one of the third plurality of nodes in the third hierarchical data structure and at least one of the first plurality of nodes or the second plurality of nodes;
receiving, at a computer system via an interface, a first request for data relating to the first and second sets of content resources;
determining, by the computer system, a first node within the third plurality of nodes in the third hierarchical data structure, responsive to the first request;
retrieving, by the computer system, one or more of the node mapping data of the third hierarchical data structure, the node mapping data defining one or more associations between the first node and at least a second node within the first plurality of nodes and a third node within the second plurality of nodes;
accessing, by the computer system, the first hierarchical data structure within the first physical data storage, to retrieve data stored within the second node corresponding to the first set of content resources;
accessing, by the computer system, the second hierarchical data structure within the second physical data storage, to retrieve data stored within the third node corresponding to the second set of content resources; and computing and outputting, by the computer system, a response to the first request, based on the data retrieved from the second node of the first hierarchical data structure and the third node of the second hierarchical data structure.

2. The computer-implemented method of claim 1, wherein generating the first and the second hierarchical data structures comprises:
   determining a first computer server associated with the first physical data storage on which to generate the first hierarchical data structure;
   determining a second computer server associated with the second physical data storage on which to generate the second hierarchical data structure;
   determining a first subset and a second subset of system users;
   initiating execution, on the first computer server, of the first machine-learning algorithm, to process a first plurality of network sessions associated with the first subset of system users; and
   initiating execution, on the second computer server, of the second algorithm, to process a second plurality of network sessions associated with the second subset of system users.

3. The computer-implemented method of claim 2, wherein the second algorithm is a second machine-learning algorithm, and wherein the first machine-learning algorithm and the second machine-learning algorithm are different machine-learning algorithms, each of which comprises one or more of:
   an article extraction algorithm;
   a BM25f ranking algorithm;
   a LIBLINEAR large-scale linear classification algorithm;
   a bag-of-words vector space model algorithm; or
   a neural network or deep learning neural network.

4. The computer-implemented method of claim 1, wherein the retrieved node mapping data defines a set of logical conjunction rules associating the first node with a plurality of additional nodes within the first and second hierarchical data structure.

5. The computer-implemented method of claim 1, wherein the first request received via the interface comprises a first classification topic, and wherein the method further comprises:
   retrieving the first node associated with the first classification topic from an index of the third hierarchical data structure;
   using the node mapping data to identify a plurality of additional nodes corresponding to the first node within the first and second hierarchical data structures, including at least the second node and the third node;
   determining a plurality of additional classification topics associated with the plurality of additional nodes within the first and second hierarchical data structures; and
   outputting the plurality of additional classification topics, in response to the first request.

6. The computer-implemented method of claim 1, wherein the first request received via the interface comprises a first classification topic, and wherein the method further comprises:
   retrieving the first node associated with the first classification topic from an index of the third hierarchical data structure;
   using the node mapping data to identify a plurality of additional nodes corresponding to the first node within the first and second hierarchical data structures, including at least the second node and the third node; and
   retrieving, from the first physical data storage and the second physical data storage, data identifying a plurality of documents associated with the plurality of additional nodes, the plurality of documents corresponding to web-based resources accessed by system users during the network sessions.

7. The computer-implemented method of claim 1, wherein the first request received via the interface comprises a classification request identifying a first web-based resource, and wherein the method further comprises:
   transmitting data corresponding to the first web-based resource to a first server associated with the first hierarchical data structure;
   transmitting data corresponding to the first web-based resource to a second server associated with the second hierarchical data structure;
   receiving, from the first server associated with the first hierarchical data structure, first classification data responsive to the classification request;
   receiving, from the second server associated with the second hierarchical data structure, second classification data responsive to the classification request;
   aggregating the first classification data and the second classification data; and
   outputting the aggregated first and second classification data, in response to the first request.

8. The computer-implemented method of claim 1, further comprising:
   receiving, via the interface, a request to update the third hierarchical data structure; and
   in response to the request to update the third hierarchical data structure, revising the node mapping data for at least one of the third plurality of nodes, said revising comprising updating one or more of the defined associations between the third plurality of nodes and at least one of the first plurality of nodes or the second plurality of nodes,
   wherein said revising does not affect the arrangement of the first plurality of nodes in the first hierarchical data structure, or the arrangement of the second plurality of nodes in the second hierarchical data structure.

9. A computer system comprising:
   a hardware processing unit comprising one or more processors; and
   one or more hardware memory devices storing computer-readable instructions which, when executed by hardware the processing unit, causes the computer system to:
   generate a first hierarchical data structure within a first physical data storage, the first hierarchical data structure comprising a first plurality of nodes arranged within multiple logical levels, wherein an arrangement of one or more nodes of the first plurality of nodes into the multiple logical levels of the first hierarchical data structure is determined by executing a first machine-learning algorithm on a first data set, wherein each of the first plurality of nodes stores data corresponding to a first set of content resources accessed during one or more network sessions, and wherein the first machine-learning algorithm is selected based at least in part on a first number of computing resources available to process the first data set to generate the first hierarchical data structure;

generate a second hierarchical data structure within a second physical data storage, the second hierarchical data structure comprising a second plurality of nodes arranged within multiple logical levels, wherein an arrangement of one or more nodes of the second plurality of nodes into the multiple logical levels of the second hierarchical data structure is determined by executing a second algorithm on a second data set, wherein the second algorithm is different from the first machine-learning algorithm, wherein each of the second plurality of nodes stores data corresponding to a second set of content resources accessed during one or more network sessions, wherein the second algorithm is selected based at least in part on a second number of computing resources available to process the second data set to generate the second hierarchical data structure, and wherein the arrangement of the first plurality of nodes is different from the arrangement of the second plurality of nodes;

generate a third hierarchical data structure, the third hierarchical data structure comprising a third plurality of nodes, wherein the third hierarchical data structure includes a plurality of node mapping data, each node mapping data defining an association between one of the third plurality of nodes in the third hierarchical data structure and at least one of the first plurality of nodes or the second plurality of nodes;

receive a first request for data relating to the first and second sets of content resources;

determine a first node within the third plurality of nodes in the third hierarchical data structure, responsive to the first request;

retrieve one or more of the node mapping data of the third hierarchical data structure, the node mapping data defining one or more associations between the first node and at least a second node within the first plurality of nodes and a third node within the second plurality of nodes;

access the first hierarchical data structure within the first physical data storage, to retrieve data stored within the second node corresponding to the first set of content resources;

access the second hierarchical data structure within the second physical data storage, to retrieve data stored within the third node corresponding to the second set of content resources; and compute and output a response to the first request, based on the data retrieved from the second node of the first hierarchical data structure and the third node of the second hierarchical data structure.

10. The computer system of claim 9, wherein generating the first and the second hierarchical data structures comprises:

determining a first computer server associated with the first physical data storage on which to generate the first hierarchical data structure;

determining a second computer server associated with the second physical data storage on which to generate the second hierarchical data structure;

determining a first subset and a second subset of system users;

initiating execution, on the first computer server, of the first machine-learning algorithm, to process a first plurality of network sessions associated with the first subset of system users; and initiating execution, on the second computer server, of the second algorithm, to process a second plurality of network sessions associated with the second subset of system users.

11. The computer system of claim 10, wherein the second algorithm is a second machine-learning algorithm, and wherein the first machine-learning algorithm and the second machine-learning algorithm are different machine-learning algorithms, each of which comprises one or more of:

an article extraction algorithm;
a BM25f ranking algorithm;
a LIBLINEAR large-scale linear classification algorithm;
a bag-of-words vector space model algorithm; or
a neural network or deep learning neural network.

12. The computer system of claim 9, wherein the retrieved node mapping data defines a set of logical conjunction rules associating the first node with a plurality of additional nodes within the first and second hierarchical data structure.

13. The computer system of claim 9, wherein the first request received via the interface comprises a first classification topic, and wherein the computer-readable instructions, when executed by the hardware processing unit, further causes the computer system to:

retrieve the first node associated with the first classification topic from an index of the third hierarchical data structure;

use the node mapping data to identify a plurality of additional nodes corresponding to the first node within the first and second hierarchical data structures, including at least the second node and the third node;

determine a plurality of additional classification topics associated with the plurality of additional nodes within the first and second hierarchical data structures; and output the plurality of additional classification topics, in response to the first request.

14. The computer system of claim 9, wherein the first request received via the interface comprises a first classification topic, and wherein the computer-readable instructions, when executed by the hardware processing unit, further causes the computer system to:

retrieve the first node associated with the first classification topic from an index of the third hierarchical data structure;

use the node mapping data to identify a plurality of additional nodes corresponding to the first node within the first and second hierarchical data structures, including at least the second node and the third node; and retrieve, from the first physical data storage and the second physical data storage, data identifying a plurality of documents associated with the plurality of additional nodes, the plurality of documents corresponding to web-based resources accessed by system users during the network sessions.

15. The computer system of claim 9, wherein the first request received via the interface comprises a classification request identifying a first web-based resource, and wherein the computer-readable instructions, when executed by the hardware processing unit, further causes the computer system to:

transmit data corresponding to the first web-based resource to a first server associated with the first hierarchical data structure;

transmit data corresponding to the first web-based resource to a second server associated with the second hierarchical data structure;

receive, from the first server associated with the first hierarchical data structure, first classification data responsive to the classification request;

receive, from the second server associated with the second hierarchical data structure, second classification data responsive to the classification request;

aggregate the first classification data and the second classification data; and output the aggregated first and second classification data, in response to the first request.

16. The computer system of claim 9, wherein the computer-readable instructions, when executed by the hardware processing unit, further causes the computer system to:

receive, via the interface, a request to update the third hierarchical data structure; and in response to the request to update the third hierarchical data structure, revise the node mapping data for at least one of the third plurality of nodes, said revising comprising updating one or more of the defined associations between the third plurality of nodes and at least one of the first plurality of nodes or the second plurality of nodes, wherein said revising does not affect the arrangement of the first plurality of nodes in the first hierarchical data structure, or the arrangement of the second plurality of nodes in the second hierarchical data structure.

17. A non-transitory computer-readable medium comprising one or more instructions stored thereon, that upon execution by one or more processors, causes the one or more processors to:

generate a first hierarchical data structure within a first physical data storage, the first hierarchical data structure comprising a first plurality of nodes arranged within multiple logical levels, wherein an arrangement of one or more nodes of the first plurality of nodes into the multiple logical levels of the first hierarchical data structure is determined by executing a first machine-learning algorithm on a first data set, wherein each of the first plurality of nodes stores data corresponding to a first set of content resources accessed during one or more network sessions, and wherein the first machine-learning algorithm is selected based at least in part on a first number of computing resources available to process the first data set to generate the first hierarchical data structure;

generate a second hierarchical data structure within a second physical data storage, the second hierarchical data structure comprising a second plurality of nodes arranged within multiple logical levels, wherein an arrangement of one or more nodes of the second plurality of nodes into the multiple logical levels of the second hierarchical data structure is determined by executing a second algorithm on a second data set, wherein the second algorithm is different from the first machine-learning algorithm, wherein each of the second plurality of nodes stores data corresponding to a second set of content resources accessed during one or more network sessions, wherein the second algorithm is selected based at least in part on a second number of computing resources available to process the second data set to generate the second hierarchical data structure, and wherein the arrangement of the first plurality of nodes is different from the arrangement of the second plurality of nodes;

generate a third hierarchical data structure, the third hierarchical data structure comprising a third plurality of nodes, wherein the third hierarchical data structure includes a plurality of node mapping data, each node mapping data defining an association between one of the third plurality of nodes in the third hierarchical data structure and at least one of the first plurality of nodes or the second plurality of nodes;

receive a first request for data relating to the first and second sets of content resources;

determine a first node within the third plurality of nodes in the third hierarchical data structure, responsive to the first request;

retrieve one or more of the node mapping data of the third hierarchical data structure, the node mapping data defining one or more associations between the first node and at least a second node within the first plurality of nodes and a third node within the second plurality of nodes;

access the first hierarchical data structure within the first physical data storage, to retrieve data stored within the second node corresponding to the first set of content resources;

access the second hierarchical data structure within the second physical data storage, to retrieve data stored within the third node corresponding to the second set of content resources; and compute and output a response to the first request, based on the data retrieved from the second node of the first hierarchical data structure and the third node of the second hierarchical data structure.

18. The non-transitory computer-readable medium of claim 17, wherein generating the first and the second hierarchical data structures comprises:

determining a first computer server associated with the first physical data storage on which to generate the first hierarchical data structure;

determining a second computer server associated with the second physical data storage on which to generate the second hierarchical data structure;

determining a first subset and a second subset of system users;

initiating execution, on the first computer server, of the first machine-learning algorithm, to process a first plurality of network sessions associated with the first subset of system users; and initiating execution, on the second computer server, of the second algorithm, to process a second plurality of network sessions associated with the second subset of system users.

19. The non-transitory computer-readable medium of claim 18, wherein the second algorithm is a second machine-learning algorithm, and wherein the first machine-learning algorithm and the second machine-learning algorithm are different machine-learning algorithms, each of which comprises one or more of:

an article extraction algorithm;
a BM25f ranking algorithm;
a LIBLINEAR large-scale linear classification algorithm;
a bag-of-words vector space model algorithm; or
a neural network or deep learning neural network.

20. The non-transitory computer-readable medium of claim 17, wherein the retrieved node mapping data defines a set of logical conjunction rules associating the first node with a plurality of additional nodes within the first and second hierarchical data structure.

* * * * *

UNITED STATES PATENT AND TRADEMARK OFFICE
CERTIFICATE OF CORRECTION

PATENT NO. : 11,023,441 B2  
APPLICATION NO. : 15/977330  
DATED : June 1, 2021  
INVENTOR(S) : Mugali et al.

Page 1 of 1

It is certified that error appears in the above-identified patent and that said Letters Patent is hereby corrected as shown below:

In the Specification

In Column 1, Line 57, delete "like" and insert -- like. --, therefor.

In the Claims

In Column 36, Lines 50-51, in Claim 9, delete "hardware the" and insert -- the hardware --, therefor.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*